United States Patent
Sahni et al.

(10) Patent No.: US 7,509,300 B2
(45) Date of Patent: Mar. 24, 2009

(54) DYNAMIC IP ROUTER TABLES USING HIGHEST-PRIORITY MATCHING

(75) Inventors: Sartaj Kumar Sahni, Gainesville, FL (US); Haibin Lu, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 1033 days.

(21) Appl. No.: 10/613,963

(22) Filed: Jul. 3, 2003

(65) Prior Publication Data

US 2004/0105422 A1 Jun. 3, 2004

Related U.S. Application Data

(60) Provisional application No. 60/393,445, filed on Jul. 3, 2002.

(51) Int. Cl.
*G06F 7/00* (2006.01)
(52) U.S. Cl. ............................ 707/2; 707/3; 707/101; 707/104.1
(58) Field of Classification Search ................ 370/428, 370/401, 351; 707/101, 104.1, 2, 3, 100
See application file for complete search history.

(56) References Cited

U.S. PATENT DOCUMENTS 4,251,861 A    2/1981 Mago (Continued)

OTHER PUBLICATIONS

Degermark, Mikael, et al. (1997) "Small Forwarding Tables for Fast Routing Lookups" *ACM SIGCOMM Proceedings of the ACM SIGCOMM '97 conference on Applications, technologies, architectures, and protocols for computer communication*. pp. 3-14.

(Continued)

*Primary Examiner*—Seema S Rao
*Assistant Examiner*—Sai-Ming Chan
(74) *Attorney, Agent, or Firm*—Saliwanchik, Lloyd & Saliwanchik

(57) ABSTRACT

An improved system and method is provided for packet routing in dynamic router tables. Specifically, the invention relates to a method and system for using tree data structures to select the highest priority rule that matches a destination address in dynamic Internet packet routing tables. In an embodiment, a data structure called BOB (binary tree on binary tree) for dynamic router tables in which the rule filters are nonintersecting ranges and in which ties are broken by selecting the highest-priority rule that matches a destination address is disclosed. Prefix filters are a special case of nonintersecting ranges and the commonly used longest-prefix tie breaker is a special case of the highest-priority tie breaker. When an n-rule router table is represented using BOB, the highest-priority rule that matches a destination address may be found in $O(\log^2 n)$ time; a new rule maybe inserted and an old one deleted in $O(\log n)$ time. For the case when all rule filters are prefixes, the data structure PBOB (prefix BOB) permits highest-priority matching as well as rule insertion and deletion in $O(W)$ time, where W is the length of the longest prefix, each. When all rule filters are prefixes and longest-prefix matching is to be done, the data structures LMPBOB (longest matching-prefix BOB) permits longest-prefix matching in $O(W)$ time; rule insertion and deletion each take $O(\log n)$ time. On practical rule tables, BOB and PBOB perform each of the three dynamic-table operations in $O(\log n)$ time and with $O(\log n)$ cache misses. The number of cache misses incurred by LMPBOB is also $O(\log n)$.

24 Claims, 14 Drawing Sheets

U.S. PATENT DOCUMENTS

| | | | |
|---|---|---|---|
| 4,833,468 | A | 5/1989 | Larson et al. |
| 5,555,405 | A | 9/1996 | Griesmer et al. |
| 5,701,467 | A | 12/1997 | Freeston |
| 5,787,430 | A | 7/1998 | Doeringer et al. |
| 5,909,440 | A | 6/1999 | Ferguson et al. |
| 6,018,524 | A * | 1/2000 | Turner et al. ............ 370/392 |
| 6,021,131 | A | 2/2000 | Even |
| 6,041,053 | A | 3/2000 | Douceur et al. |
| 6,061,712 | A | 5/2000 | Tzeng |
| 6,092,072 | A | 7/2000 | Guha et al. |
| 6,157,955 | A | 12/2000 | Narad et al. |
| 6,212,184 | B1 | 4/2001 | Venkatachary et al. |
| 6,289,013 | B1 | 9/2001 | Lakshman et al. |
| 6,335,932 | B2 | 1/2002 | Kadambi et al. |
| 6,341,130 | B1 | 1/2002 | Lakshman et al. |
| 6,553,370 | B1 | 4/2003 | Andreev et al. |
| 6,675,157 | B1 | 1/2004 | Mitchell |
| 6,859,455 | B1 * | 2/2005 | Yazdani et al. ............ 370/392 |
| 2002/0124003 | A1 * | 9/2002 | Rajasekaran et al. ........ 707/100 |

OTHER PUBLICATIONS

Doeringer, W., G. Karjoth, and M. Nassehi (1996) "Routing on longest-matching prefixes" *IEEE/ACM Transactions on Networking*, 4(1): pp. 86-87.

Ergun, Funda, et al. (2001) "A Dynamic Lookup Scheme for Bursty Access Patterns" *Proceedings of IEEE INFOCOM* pp. 1-10.

Gupta, P. and N. McKeown (2000) "Dynamic algorithms with worst-case performance for packet classification" *IFIP Networking* pp. 528-539.

Lampson, Butler, Venkatachary Srinivasan, and George Varghese (Jun. 1999) "IP Lookups Using Multiway and Multicolumn Search" *IEEE/ACM Transactions on Networking* vol. 7, No. 3, pp. 324-334.

Lu, H. and Sahni, S. (2003) "O (log n) dynamic router-tables for prefixes and ranges" *IEEE Symposium on Computers and Communications*, pp. 1-42.

Nilsson, Stefan and Gunnar Karlsson (1998) "Fast address lookup for Internet routers" *Proceedings of IEEE Broadband Communications* (enclosed copy pp. numbered 9-18).

Ruiz-Sanchez, M., E. Biersack, and W. Dabbous (Mar./Apr. 2001) "Survery and taxonomy of IP address lookup algorithms" *IEEE Network*, 15(2): pp. 8-23.

Sahni, Sartaj and Kun Suk Kim "Data Structures of IP Lookup with Bursty Access Patterns" www.cise.ufl.edu/~sahni (enclosed copy pp. numbered 1-5).

Sahni, Sartaj and Kun Sik Kim (2001) "Efficient Construction of Fixed-Stride Multibit Tries for IP Lookup" *Proceedings of 8th IEEE Workshop on Future Trends of Distribtued Computing Systems* pp. 178-184 (enclosed copy pp. numbered 1-7).

Sahni, Sartaj and Kun Suk Kim (2002) "Efficient Construction of Variable-Stride Multibit Tries for IP Lookup" *Proceedings of IEEE Symposium on Applications and the Internet (SAINT)* pp. 220-229 (enclosed copy pp. numbered 1-8).

Sahni, Sartaj and Kun Suk Kim (Jul. 2002) "O(log n) Dynamic Packet Routing" 7th *IEEE Symposium on Computers and Communications*. pp. 1-29.

Sahni, Sartaj, Kun Suk Kim, and Haibin Lu (May 2002) "Data Structures for One-Dimensional Packet Classification Using Most-Specific-Rule Matching" *International Symposium on Parallel Architectures, Algorithms, and Networks (ISPAN)* pp. 3-14 (enclosed copy pp. numbered 1-12).

Sklower, Keith (1991) "A Tree-Based Packet Routing Table for Berkeley Unix" *Proceedings of 1991 Winter USENIX Conference* pp. 93-99 (enclosed copy pp. numbered 1-4).

Srinivasan, V. and G. Varghese (Feb. 1999) "Faster IP Lookups Using Controlled Prefix Expansion" *ACM Transactions on Computer Systems* vol. 17, issue 1, pp. 1-40 (enclosed copy pp. numbered 1-21).

Suri, S., G. Varghese, and P. Warkhede (2001) "Multiway range trees: Scalable IP lookup with fast updates" *Proceedings of Globecom '01*.

Waldvogel, Marcel et al. (1997) "Scalable High Speed IP Routing Lookups" *Proceedings of the ACM SIGCOMM '97 Conference on Applications, technologies, architectures, and protocols for computer communication*. pp. 25-36 (enclosed copy pp. numbered 1-12).

* cited by examiner

| Database | | Paix1 | Pb1 | MaeWest | Aads | Pb2 | Paix2 |
|---|---|---|---|---|---|---|---|
| Num of Prefixes | | 16172 | 22225 | 28889 | 31827 | 35303 | 85988 |
| Measure1 (KB) | PST | 884 | 1215 | 1579 | 1740 | 1930 | 4702 |
| | BOB | 851 | 1176 | 1526 | 1682 | 1876 | 4527 |
| | PBOB | 357 | 495 | 642 | 708 | 790 | 1901 |
| | LMPBOB | 357 | 495 | 642 | 708 | 790 | 1901 |
| Measure2 (KB) | PST | 221 | 303 | 395 | 435 | 482 | 1175 |
| | BOB | 331 | 455 | 592 | 652 | 723 | 1760 |
| | PBOB | 189 | 260 | 338 | 372 | 413 | 1007 |
| | LMPBOB | 189 | 260 | 338 | 372 | 413 | 1007 |

| Database | | | Paix1 | Pb1 | MaeWest | Aads | Pb2 | Paix2 |
|---|---|---|---|---|---|---|---|---|
| Search (μsec) | PST | Mean | 1.20 | 1.35 | 1.49 | 1.53 | 1.57 | 1.96 |
| | | Std | 0.01 | 0.01 | 0.04 | 0.01 | 0.00 | 0.01 |
| | BOB | Mean | 1.22 | 1.39 | 1.54 | 1.56 | 1.62 | 2.19 |
| | | Std | 0.01 | 0.02 | 0.02 | 0.02 | 0.02 | 0.01 |
| | PBOB | Mean | 0.82 | 0.98 | 1.10 | 1.15 | 1.20 | 1.60 |
| | | Std | 0.01 | 0.01 | 0.01 | 0.01 | 0.01 | 0.01 |
| | LMPBOB | Mean | 0.87 | 1.03 | 1.17 | 1.21 | 1.27 | 1.69 |
| | | Std | 0.01 | 0.01 | 0.01 | 0.01 | 0.01 | 0.01 |
| Insert (μsec) | PST | Mean | 2.17 | 2.35 | 2.53 | 2.60 | 2.64 | 3.03 |
| | | Std | 0.07 | 0.04 | 0.03 | 0.01 | 0.05 | 0.01 |
| | BOB | Mean | 1.70 | 1.89 | 2.06 | 2.10 | 2.16 | 2.55 |
| | | Std | 0.06 | 0.06 | 0.05 | 0.05 | 0.05 | 0.03 |
| | PBOB | Mean | 1.04 | 1.25 | 1.39 | 1.44 | 1.51 | 1.93 |
| | | Std | 0.06 | 0.05 | 0.00 | 0.05 | 0.05 | 0.06 |
| | LMPBOB | Mean | 1.06 | 1.29 | 1.47 | 1.50 | 1.57 | 1.98 |
| | | Std | 0.07 | 0.07 | 0.06 | 0.06 | 0.04 | 0.01 |
| Delete (μsec) | PST | Mean | 1.72 | 1.87 | 2.06 | 2.09 | 2.11 | 2.48 |
| | | Std | 0.04 | 0.05 | 0.05 | 0.06 | 0.04 | 0.06 |
| | BOB | Mean | 1.04 | 1.13 | 1.26 | 1.27 | 1.32 | 1.69 |
| | | Std | 0.06 | 0.05 | 0.04 | 0.05 | 0.06 | 0.06 |
| | PBOB | Mean | 0.68 | 0.82 | 0.90 | 0.91 | 0.97 | 1.30 |
| | | Std | 0.07 | 0.06 | 0.05 | 0.06 | 0.03 | 0.05 |
| | LMPBOB | Mean | 0.67 | 0.82 | 0.89 | 0.92 | 0.95 | 1.26 |
| | | Std | 0.06 | 0.06 | 0.05 | 0.05 | 0.03 | 0.05 |
| Num of Copies | | | 15 | 11 | 9 | 8 | 8 | 3 |

Fig. 10

DYNAMIC IP ROUTER TABLES USING HIGHEST-PRIORITY MATCHING

CROSS-REFERENCE TO RELATED APPLICATION

This application claims the benefit of U.S. Provisional Application No. 60/393,445, filed Jul. 3, 2002.

GOVERNMENT SUPPORT

This invention was made in part with funding under a funding grant, No. CCR9912395, from the National Science Foundation. The government has certain rights in the invention.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates to packet routing in dynamic router tables, specifically, to a method and system for selecting the highest priority rule that matches a destination address in dynamic Internet packet routing tables.

BACKGROUND OF THE INVENTION

Many methods for classifying and routing packets in communication systems are known in the art. In Internet packet classification systems, rules tables are used to classify and route incoming packets. An Internet router classifies incoming packets into flows utilizing information contained in packet headers and a table of classification rules, or rule or router table. Typically, packet classification is performed using only the destination address of a packet. Each rule-table rule is a pair of the form (F,A) where F is a filter and A is an action. The action component of a rule specifies what is to be done when a packet that satisfies the rule filter is received. Sample actions may include: drop the packet; forward the packet along a certain output link; and reserve a specified amount of bandwidth.

In typical Internet systems, each rule filter is a range [u,v] of destination addresses. A filter matches the destination address d if and only if $u \leq d \leq v$. Since an Internet rule-table may contain several rules that match a given destination address d, a tiebreaker is used to select a rule from the set of rules that match d. For purposes of this tiebreaker, each rule is assigned a priority, and the highest-priority rule that matched d determines the action for all packets whose destination address is d. Rule tables commonly include filters that specify ranges, wherein the highest-priority matching filter is used as highest-priority range-tables (HPRT). When the filters of no two rules of an HPRT intersect, the HPRT is a nonintersecting HPRT (NHPRT).

In a static rule table, the rule does not vary in time. For static rule tables, it is important to minimize the time required to process an incoming packet by searching, or looking up, the rule table for the rule to use. In addition, the processing time required to create the rule-table data structure needs to be minimized. Further, the storage requirements of the rule table structure need to be reduced to allow efficient operation. In practice, rule tables are seldom truly static. At best, rules may be added to or deleted from the rule table infrequently. Typically, in a static rule table, inserts/deletes are batched and rule-table data structure is reconstructed as needed.

In a dynamic rule table, rules are added/deleted with some frequency. For such tables, inserts/deletes are not batched. Rather, they are performed in real time. For such tables, the time required to insert/delete a rule is a concern. For a dynamic rule table, the initial rule-table data structure is constructed by starting with an empty data structure and then inserting the initial set of rules into the data structure one by one. Consequently, in the case of dynamic tables, the preprocessing metric, mentioned above, is very closely related to the insert time.

Data structures for rule tables in which each filter is a destination address prefix and the rule priority is the length of this prefix, or longest-matching prefix-tables (LMPT), have been intensely researched in recent years. Although every LMPT is also an NHPRT, an NHPRT may not be an LMPT.

Ruiz-Sanchez et al. ("Survey and Taxonomy of IP address lookup algorithms," *IEEE Network*, 8-23 (2001)) review data structures for static LMPTs and Sahni et al. ("Data structures for one-dimensional packet classification using most-specific-rule matching," *International Symposium on Parallel Architectures, Algorithms, and Networks* (*ISPAN*) (2002)) review data structures for both static and dynamic LMPTs. Several tree-based, or "trie"-based, data structures for LMPTs have been proposed (see Sklower, K., "A tree-based routing table for Berkeley Unix," Technical Report, University of California, Berkeley (1993); Degermark et al., "Small forwarding tables for fast routing lookups," *ACM SIGCOMM*, 3-14 (1997); Doeringer et al., "Routing on longest-matching prefixes," *IEEE/ACM Transactions on Networking*, 4(1):86-97 (1996); Nilsson, S. and G. Karlsson, "Fast address look-up for Internet routers," *IEEE Broadband Communications* (1998); Srinivasan, V. and G. Varghese, "Faster IP lookups using controlled prefix expansion," *ACM Transactions on Computer Systems*, 1-40 (1999); Sahni S. and K. Kim, "Efficient construction of fixed-Stride multibit tries for IP lookup," *Proceedings 8th IEEE Workshop on Future Trends of Distributed Computing Systems* (2001); and Sahni, S. and K. Kim, "Efficient construction of variable-stride multibit tries for IP lookup," *Proceedings IEEE Symposium on Applications and the Internet* (*SAINT*), 220-227 (2002)).

Structures such as that proposed by Sklower (Technical Report, University of California, Berkeley (1993)) perform each of the dynamic router-table operations (lookup, insert, delete) in O(W) time. W is commonly used to denote the maximum possible length of a prefix. In IPv4, W=32 and in IPv2, W=128.

Others (i.e., Degermark et al., *ACM SIGCOMM*, 3-14 (1997); Doeringer et al., *IEEE/ACM Transactions on Networking* 4(1):86-97 (1996); Nilsson, S. and G. Karlsson, *IEEE Broadband Communications* (1998); Srinivasan, V. and G. Varghese, *ACM Transactions on Computer Systems* (1999); Sahni, S. and K. Kim, *Proceedings 8th IEEE Workshop on Future Trends of Distributed Computing Systems* (2001); and Sahni, S. and K. Kim, *Proceedings IEEE Symposium on Applications and the Internet* (*SAINT*) (2002)) attempt to optimize lookup time and memory requirement through an expensive preprocessing step. These structures, while providing very fast lookup capability, have a prohibitive insert/delete time and so, they are suitable only for static router-tables (i.e., tables into/from which no inserts and deletes occur).

Waldvogel et al. ("Scalable high speed IP routing lookups," *ACM SIGCOMM*, 25-36 (1997)) have proposed a scheme that performs a binary search on hash tables organized by prefix length. This binary search scheme has an expected complexity of O(log W) for lookup. An alternative adaptation of binary search to longest-prefix matching was developed by Lampson et al. ("IP lookup using multi-way and multicolumn search," *IEEE INFOCOM* 98 (1998)). Using this adaptation, a lookup in a table that has n prefixes takes O(W+logn)=O(W) time. Because the schemes of Lampson et al. (as well as those of Waldvogel et al.) use expensive pre-computation, they are not suited for dynamic router tables.

Suri et al. ("Multiway range trees: Scalable IP lookup with fast updates," *GLOBECOM* (2001) have proposed a B-tree data structure for dynamic LMPTs. Using their structure, the longest matching-prefix, LMP(d), may be found in O(logn) time. However, inserts/deletes take O(W logn) time. When W bits fit in O(1) words (as is the case for IPv2 and IPv6 prefixes) logical operations on W-bit vectors can be done in O(1) time each. In this case, the scheme of Suri et al. takes O(W+ logn)=O(W) time for an update. The number of cache misses that occur when the data structure of [19] is used is O(logn) per operation.

Sahni and Kim (see "O(logn) dynamic packet routing," *IEEE Symposium on Computers and Communications* (2002)) have developed data structures called a collection of red-black trees (CRBT) and alternative collection of red-black trees (ACRBT) that support the three operations of a dynamic LMPT in O(logn) time each. The number of cache misses is also O(logn).

When an HPPT (highest-priority prefix-table) is represented as a binary trie (See Horowitz et al., *Fundamentals of Data Structures in C++*, W. H. Freeman, NY, 653 pages (1995)), each of the three dynamic HBRT operations takes O(W) time and cache misses. Gupta and McKeown ("Dynamic algorithms with worst-case performance for packet classification," *IFIP Networking* (2000)) have developed two data structures for dynamic HRPTs-heap on trie (HOT) and binary search trie on tree (BOT). The HOT structures take O(W) time for a lookup and O(W logn) time for an insert or delete. The BOT structure takes O(W logn) time for a lookup and O(W) time for an insert/delete. The number of cache misses in a HOT and BOT is asymptotically the same as the time complexity of the corresponding operation. However it would be desirable to reduce these times as much as possible to efficiently route packets.

In addition to the above mentioned papers, a number of U.S. patents and published applications address dynamic routing schemes including, but not limited to U.S. Pat. Nos. 6,341,130; 6,335,932; 6,289,013; 6,212,184; 6,157,955; 6,092,072; 6,061,712; 6,041,053; 6,021,131; 6,018,524; 5,909,440; 5,787,430; 5,701,467; 5,555,405; 4,833,468; 4,251,861; each of which is incorporated herein by reference.

Accordingly, there is a need in the art for a dynamic data table routing structure to provide more effective ways to classify and route data packets for NHPRT's, HPPT's, and LMPT's. Specifically, the structure needs to provide a quicker and more memory efficient method to search, insert and delete items in a dynamic router data table.

SUMMARY OF THE INVENTION

In view of the foregoing deficiencies of the prior art, it is an object of the present invention to provide an improved system and method for matching, inserting and deleting rules in a dynamic router table.

It is another object of this invention to provide a system and method for matching, inserting and deleting of rules in a dynamic NHPRT using binary tree on binary tree (BOB) data structures.

It is yet another object of this invention to provide a system and method for matching, inserting and deleting of rules in a dynamic HPPT using prefix binary tree on binary tree (PBOB) data structures.

It is still another object of this invention to provide a system and method for matching, inserting and deleting of rules in a dynamic LMPT using longest matching prefix binary tree on binary tree (LMPBOB) data structures.

The advantages of the invention are numerous. One significant advantage of the invention is that it provides a more memory efficient data structure, allowing better system resource allocation. Compared to conventional methods, the invention also significantly reduces the time required to insert and delete tuples in a dynamic prefix data table and at the same time provides efficient lookup. Moreover, for nonintersecting range router table, the invention significantly reduces the time required to search, insert, and delete tuples. Furthermore, by implementing the current invention in dynamic routers, network congestion can be reduced, throughput of network traffic can be increased, router table updates can be performed in real time, and the number of lost packets can be reduced.

Other aspects and advantages of the invention will become apparent from the following detailed description taken in conjunction with the accompanying drawings, illustrating, by way of example, the principles of the invention.

All patents, patent applications, provisional applications, and publications referred to or cited herein, or from which a claim for benefit of priority has been made, are incorporated herein by reference in their entirety to the extent they are not inconsistent with the explicit teachings of this specification.

BRIEF DESCRIPTION OF THE DRAWINGS

FIG. 10 is a table tabulating the prefix times for a BOB, a PBOB, and a LMPBOB of the current invention compared to a PST data structure.

Figure 1A:
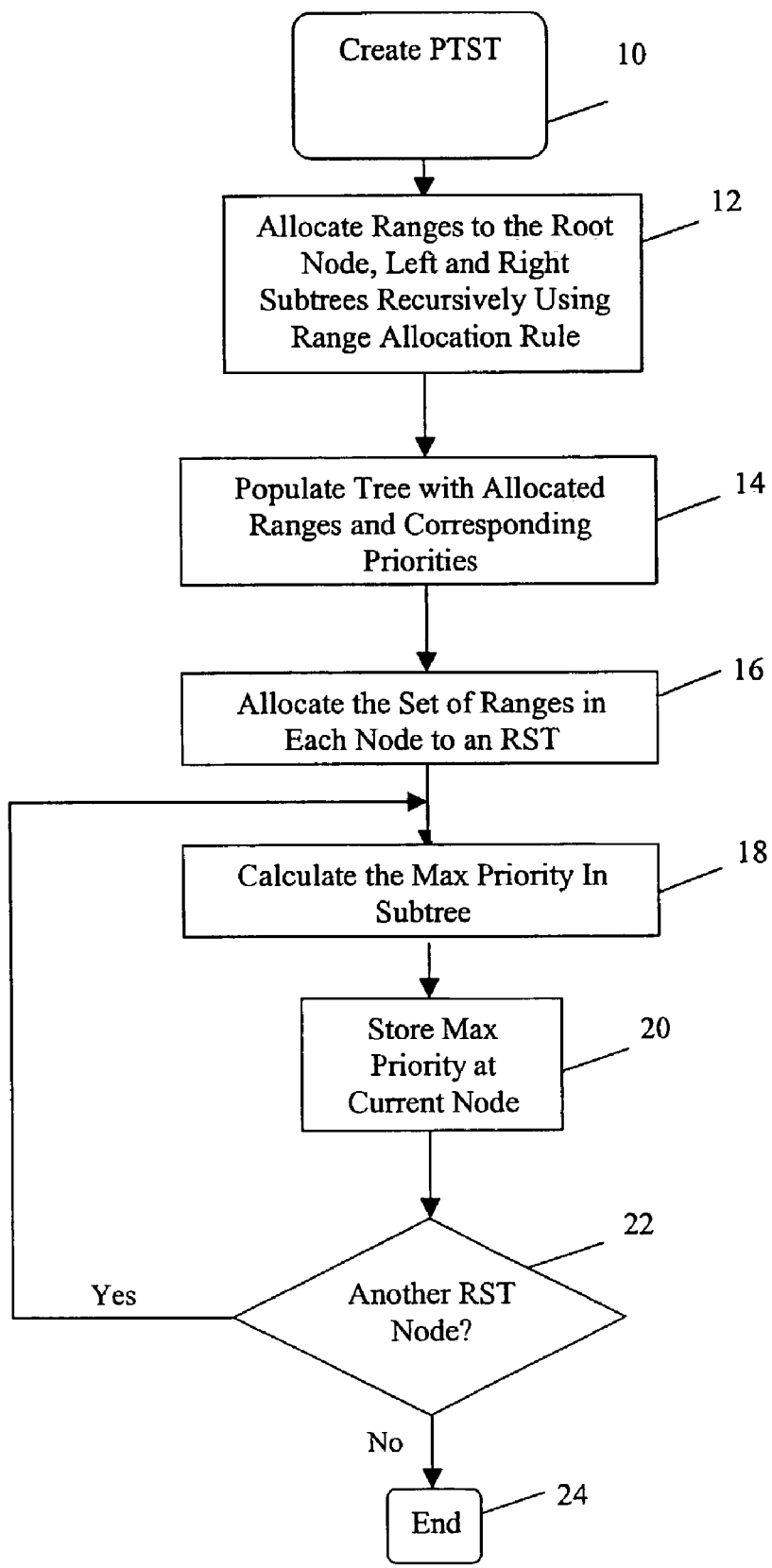
FIG. 1A is a flow chart illustrating the steps for creating and populating a binary on binary (BOB) tree for a Nonintersecting Highest Priority Rule Table (NHRT).

It should be understood that in certain situations for reasons of computational efficiency or ease of maintenance, the ordering and relationships of the blocks of the illustrated flow charts could be rearranged or re-associated by one skilled in the art.

DETAILED DESCRIPTION OF THE INVENTION

Briefly, the current invention is used to provide an improved system and method for matching, inserting, and deleting data in a dynamic router table. Specifically, efficient data structures for dynamic NHPRTs, HPPTs and LMPTs are disclosed. In an embodiment of the invention, a binary tree on binary tree (BOB) data structure is proposed for the representation of dynamic NHPRTs. In a preferred embodiment, a top level, single balanced binary search tree in combination with lower level-range search trees is implemented in NHRT-type dynamic routers. Using a BOB of the present invention, a lookup process takes $O(\log^2 N)$ time and cache misses and a new rule maybe inserted and old one deleted in $O(\log n)$ time and cache misses.

For HPPTs, a Prefix BOB (PBOB), a modified version of a BOB, is disclosed. In a preferred embodiment, a top level, single-balanced binary search tree in combination with an array linear list is implemented for an HPPT. According to the PBOB embodiment of the present invention, a lookup, rule insertion and deletion each take $O(W)$ time and cache misses.

Further, an LMPBOB (longest matching-prefix BOB) data structure embodiment is disclosed for use with LMPTs. In a preferred embodiment, a top level, single-balanced binary search tree in combination with a W-bit vector is implemented for an LMPT. Using a LMPBOB, the longest matching-prefix maybe found in $O(W)$ time and $O(\log n)$ cache misses and rule insertion and deletion each take $O(\log n)$ time and cache misses. On practical rule tables, BOB and PBOB perform each of the three dynamic-table operations in $O(\log n)$ time and with $O(\log n)$ cache misses.

Definition of Terms

As used herein, the term "node" refers to an entry into a tree structure.

As used herein, the term "child" or "children" refers to the subsequent node(s) any given node points to. The term "parent" refers to the node that points to any given node or child. The term "sibling," as used herein, refers to nodes or children having the same parent.

The term "root," as used herein, refers to the top node of a tree structure and the term "leaf," refers to a node with no children.

The term "trie," as used herein, refers to a tree structure organized for searching data.

I. Binary on Binary (BOB) Tree for a Nonintersecting Highest Priority Rule Table (NHRT).

In an embodiment, the present invention combines a top level balanced binary search tree called a point search tree (PTST) with lower level range search trees (RST's) in NHRT-type dynamic routers to reduce the processing time required to search, insert, and delete tuples. The PTST can be any standard red-black binary search tree, or any other binary search tree structure that supports efficient search, insert and delete methods as known in the art.

In a preferred embodiment, the PTST is any standard balanced binary search tree that has at most 2n nodes, with each node z associated with a point, point(z). On every node z of the PTST, nodes in the left of the subtree of z have smaller point values than point(z), and nodes in the right subtree of z have larger point values than point(z). Where R is the set of nonintersecting ranges of the NHRT, each range of R is stored in exactly one of the nodes of the PTST. Thus, the root of the PTST stores (1) all ranges r∈R such that start(r)≦point(root) ≦finish(r); (2) all ranges r∈R such that finish(r)≦point(root) are stored in the left subtree of the root; and (3) all ranges r∈R such that point(root)≦start(r) (i.e., the remaining ranges of R) are stored in the right subtree of the root, hereinafter referred to as the "range allocation rule." The ranges allocated to the left and right subtrees of the root are allocated to nodes in these subtrees using the range allocation rule recursively.

Figure 1B:
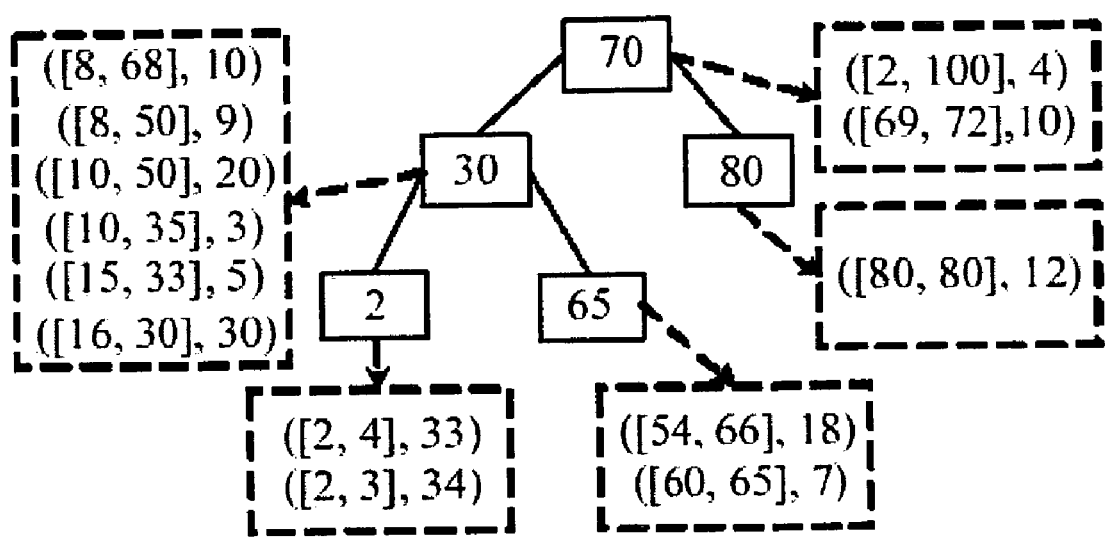
FIG. 1B is an illustration of an exemplary PTST for a set of ranges.

Referring now to FIGS. 1A and 1B, a PTST is created 10 and assigned node point values using the range allocation rule, wherein nodes in the left subtree have smaller point values than the root node, and nodes in the right subtree have larger point values than the root node. Next, the nonintersecting ranges are allocated 12 to the nodes of the newly created PTST, wherein all ranges containing the point value of the root node are stored in the root node. Further, all ranges having a finish point less than the chosen root node are stored in the left subtree of the root node, and all ranges having a start point greater than the chosen root node are stored in the right subtree of the root node. The PTST is then populated with the allocated ranges and corresponding priorities 14. The following Table 1 provides an example set of non-intersecting ranges and FIG. 1B illustrates a possible PTST for the set of ranges provided in Table 1.

TABLE 1

| A non-intersecting range set | |
| --- | --- |
| Range | Priority |
| [2, 100] | 4 |
| [2, 4] | 33 |
| [2, 3] | 34 |
| [8, 68] | 10 |
| [8, 50] | 9 |
| [10, 50] | 20 |
| [10, 35] | 3 |
| [15, 33] | 5 |
| [16, 30] | 30 |
| [54, 66] | 18 |
| [60, 65] | 7 |
| [69, 72] | 10 |
| [80, 80] | 12 |

Next, subsets of the ranges are further allocated to another tree structure, such as a red-black tree, at each node in the PTST 16. This red-black tree, each node of which stores exactly one range, is then called a range search-tree or RST (z). Each node of the resulting RST stores exactly one range. This range is also referred to herein as range(x). Further, each node includes a maximum of the priorities of the ranges associated with the nodes in the subtree rooted at that node 18, wherein the maximum priority is the given priority if the node is a leaf, or the maximum of the left child, right child, and given priority, if the node is not a leaf. The calculated maximum priority (mp(x)) is stored at the current node 20, and the traversal process continued for each RST node 22 until the tree is filled 24. The maximum priority may be defined recursively as below:

$$mp(x) = \begin{cases} p(x) & \text{if } x \text{ is a leaf} \\ \max\{mp(leftChild(x)), mp(rightChild(x)), p(x)\} & \text{otherwise} \end{cases}$$

where p(x)=priority(range(x)).

Figure 2:
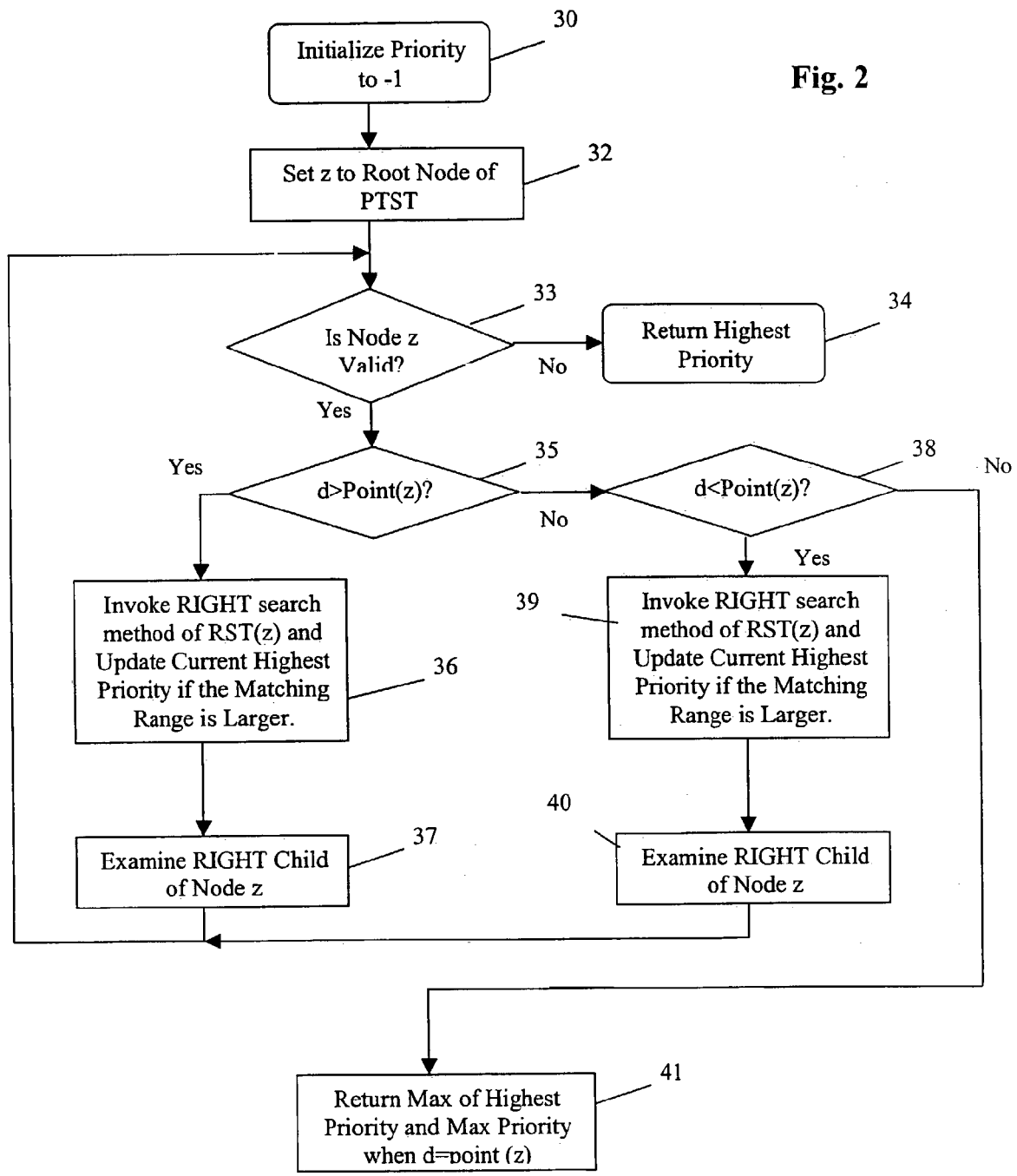
FIG. 2 is a flow chart illustrating the steps for finding the highest priority range for a given destination address in a BOB tree for an NHRT.

Using the BOB, the highest priority ranges that matches a given destination address (d) is found by following a search path from the root of the PTST toward a leaf of the PTST. FIG. 2 provides a flow chart for the process. The process begins by initializing the priority to a value (i.e., a value of −1 when all priorities are ≧zero) 30 and setting a node, z, to the root node of the PTST 32. Next, if node z is not a valid node 33, the process returns the highest priority 34. If node z is a valid node in step 33, the PTST is then searched to find matching ranges. If d is greater than the point value of node z of the PTST 35, then the right search method is invoked for matching ranges in the associated RST, and the current highest priority value updated accordingly 36. Next, the right child of node z is examined 37 as the process continues at step 33.

Alternatively, if d is not greater than the point value of node z of the PTST in step 35, and the point value of node z is greater than d 38, then the left search method is invoked for matching ranges in the associated RST, and the current highest priority value updated accordingly 39. Next, the left child of node z is examined 40 as the process continues at step 33.

If d is equal to the node value in step 38, the highest priority value is computed as the maximum of the current highest priority value and the maximum priority of the RST root node of the current PTST node, and the highest priority value is returned 41.

An exemplary lookup algorithm of the highest-priority range that matches destination address d according to the present invention might be:

```
Algorithm hp(d) {
    // return the length of hpr(d)
    // easily extended to return hpr(d)
    hp = -1; // assuming 0 is the smallest priority value
    z = root; // root of PTST
    while (z != null) {
        if (d > point(z)) {
            RST(z)->hpRight(d, hp);
            z = rightChild(z);
        }
        else if(d < point(z)) {
            RST(z)->hpLeft(d, hp)
            z = leftChild(z);
        }
        else // d == point(z)
            return max {hp, mp(RST(z_=>root)};
    }
    return hp;
}
```

With reference to the exemplary algorithm described above, the complexity of the invocation "RST(z)->hpRight(d,hp)" can be observed to be O(height(RST(z)) O(log n). Consequently, the complexity of hp(d) is O(log²n). Determination of the highest-priority range that matches destination address d (hpr(d)) requires the addition of code to the methods hp(d), hpRight(d, hp), and hp Left(d, hp) so as to keep track of the range whose priority is the current value of hp. Thus, hpr(d) may be found in O(log²n) time.

Figure 3A:
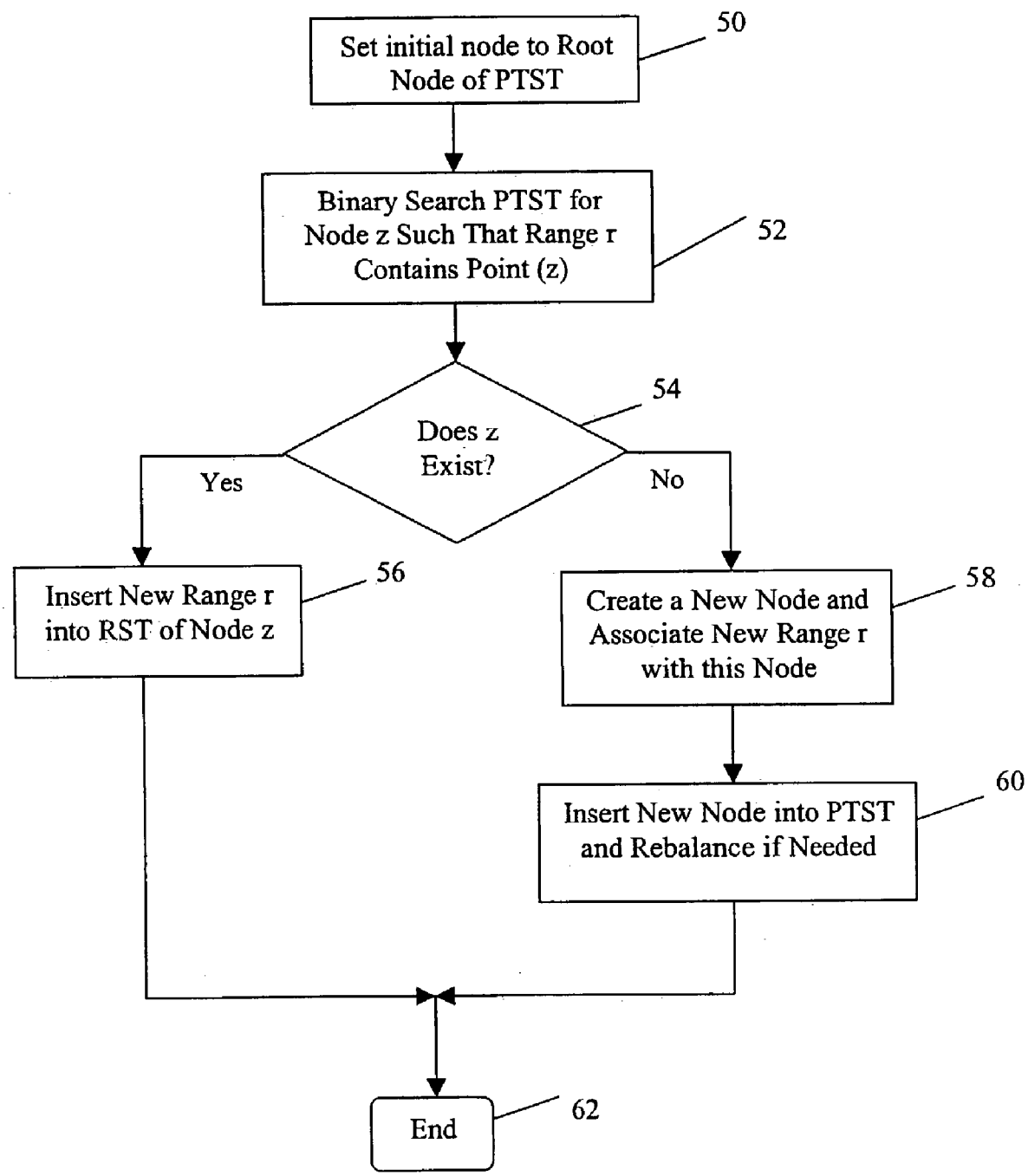
FIG. 3A is a flow chart illustrating the steps for inserting a new range in a BOB tree for an NHRT.

According to an embodiment of the invention, a range (r) that is known to have no intersection with any of the existing ranges in the router table, can be efficiently inserted into the table. As shown in the flow chart of FIG. 3A, the process begins by setting the initial node to the root node of the PTST 50. The PTST is then searched to find a node z such that r contains point (z) 52. If such a PTST node z exists 54, the range r is inserted into the RST of the node z 56 and the process ends 62. If no node z exists in step 54, than a new node is created and associated with new range r 58. Next, the new node is inserted into the PTST and the PTST tree is rebalanced if needed 60 (see Horowitz et al., *Fundamental of Data Structures in C++*, W. H. Freeman, NY, 653 pages (1995)). The rebalancing step may require color changes and at most one rotation. The process then ends in step 62.

In accordance with the present invention, the following is an exemplary algorithm to insert a nonintersecting range:

```
Algorithm insert(r) {
    // insert the nonintersecting range r
    z = root; // root of PTST
    while (z != null) {
        if (finish(r) < point(z))
            z = leftChild(z);
        else if (start(r) > point(z))
            z = rightChild(z);
        else {// r matches point(z)
            RST(z)->insert(r);
            return
        }
    }
    // there is no node z such that r matches point(z)
    // insert a new node into PTST
    insertNewNode(r);
}
```

Exclusive of the time required to perform the tasks associated with a rebalancing rotation, the time required to insert a range is O(height(PTST))=O(log n). As described below, a rebalancing rotation can be performed in O(log n) time. Since at most one rebalancing rotation is needed following an insert, the time to insert a range is O(logn). When it is necessary to verify that the range to be inserted does not intersect an existing range, the PTST can be augmented with priority search trees that can be used for intersection detection. The overall complexity of an insert remains O(log n).

Figure 3B:
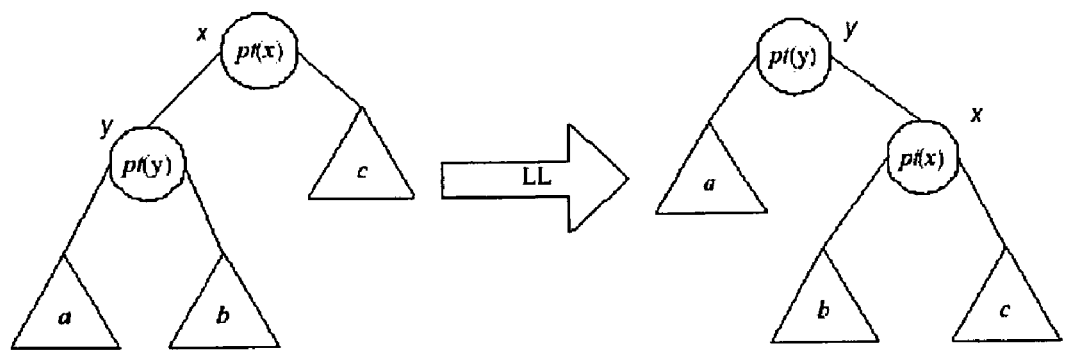
FIGS. 3B and 3C illustrate rotations used to rebalance a tree structure following an insertion or deletion of a range in accordance with the present invention.
Figure 3C:
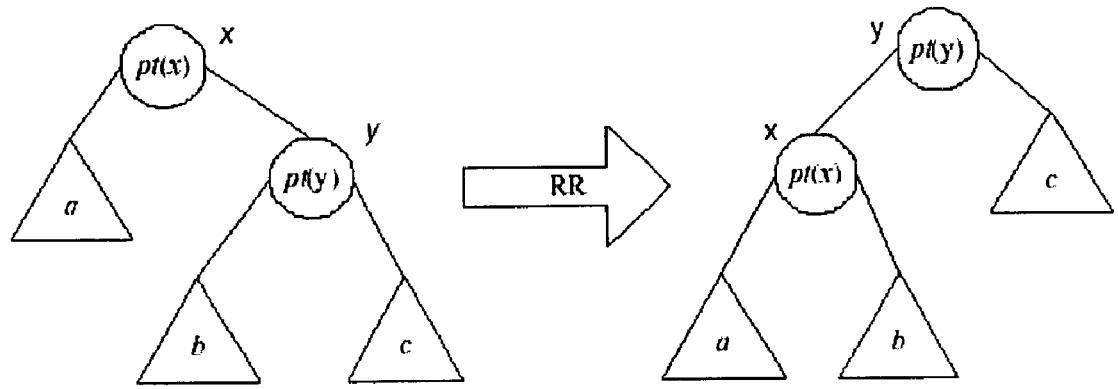

FIGS. 3B and 3C show the red-black LL and RR rotations, respectively, used to rebalance a red-black tree following an insert of a nonintersecting range, as previously described, or a delete, described below. In these figures, pt( ) is an abbreviation for point( ). Because the remaining rotation types, LR and RL, may, respectively, be viewed as an RR rotation followed by an LL rotation and an LL rotation followed by an RR rotation, it suffices to examine LL and RR rotations alone.

Using the following lemma (and corresponding proof), a red-black tree can be rebalanced using LL or RR rotations.

Lemma: R is a set of nonintersecting ranges and ranges(z) ⊆ R are the ranges allocated by the range allocation rule to node z of the PTST prior to an LL or RR rotation. Let ranges'(z) be this subset for the PTST node z following the rotation ranges(z)=ranges'(z) for all nodes z in the subtrees a, b, and c of FIGS. 3B and 3C.

Proof: consider an LL rotation ranges(subtree(x)) is the union of the ranges allocated to the nodes in the subtree whose root is x. Thus, the range allocation rule allocates each range r to the node z nearest the root such that r matches point(z), ranges(subtree(x))=ranges'(subtree(y)). Further, r∈ranges(a) if r∈ranges(stthtree(x)) and finish(r)<point(y). Consequently, r∈ranges '(a). From this and the fact that the LL rotation does not change the positioning of nodes in a, it follows that for every node z in the subtree a, ranges(a)=ranges'(a). The proof for the nodes in b and c as well as for the RR rotation is similar.

With reference to FIGS. 3B and 3C, it follows from the previously described Lemma that ranges(z)=ranges'(z) for all z in the PTST except possibly for z∈ {x, y}. Thus, ranges'(y)=ranges(y)∪S and ranges' (x)=ranges(x)−S, where S={r|r∈ranges(x)∧start(r)≦point(y)≦finish(r)}. Because the ranges are nonintersecting ranges, all ranges in ranges(y) are nested within the ranges of S. In addition, the range rMax of S with largest start( ) value may be found by searching RST(x) for the range with largest start( ) value that matches point(y). Where RST(x) is a binary search tree of an ordered set of ranges, rMax may be found in O(height(RST(x)) time by following a path from the root downward. Where rMax does not exist, S=Ø, ranges '(x)=ranges(x) and ranges'(y)=ranges (y).

With the assumption that rMax exists, the operation may be "split" to extract from RST(x) the ranges that belong to S. The following split operation: RST(x)→split(small, rMax, big) separates RST(x) into an RST small of ranges<than rMax and an RST big of ranges>than rMax. Thus, RST'(x)=big and RST'(y)=join(small, rMax, RST(y)), where "join" (see Horowitz et al., *Fundamentals of Data Structures in C++*, W. H Freeman, NY, 653 pages (1995)) combines the red-black tree small with ranges<rMax, the range rMax, and the red-black tree RST(y) with ranges>rMax into a single red-black tree.

The standard split and join operations may require slight modification so as to update the mp values of affected nodes. This modification does not affect the asymptotic complexity, which is logarithmic in the number of nodes in the tree being split or logarithmic in the sum of the number of nodes in the two trees being joined, of the split and join operations. Therefore, the complexity of performing an LL or RR rotation (and hence of performing an LR or RL rotation) in the PTST is O(log n).

Figure 4:
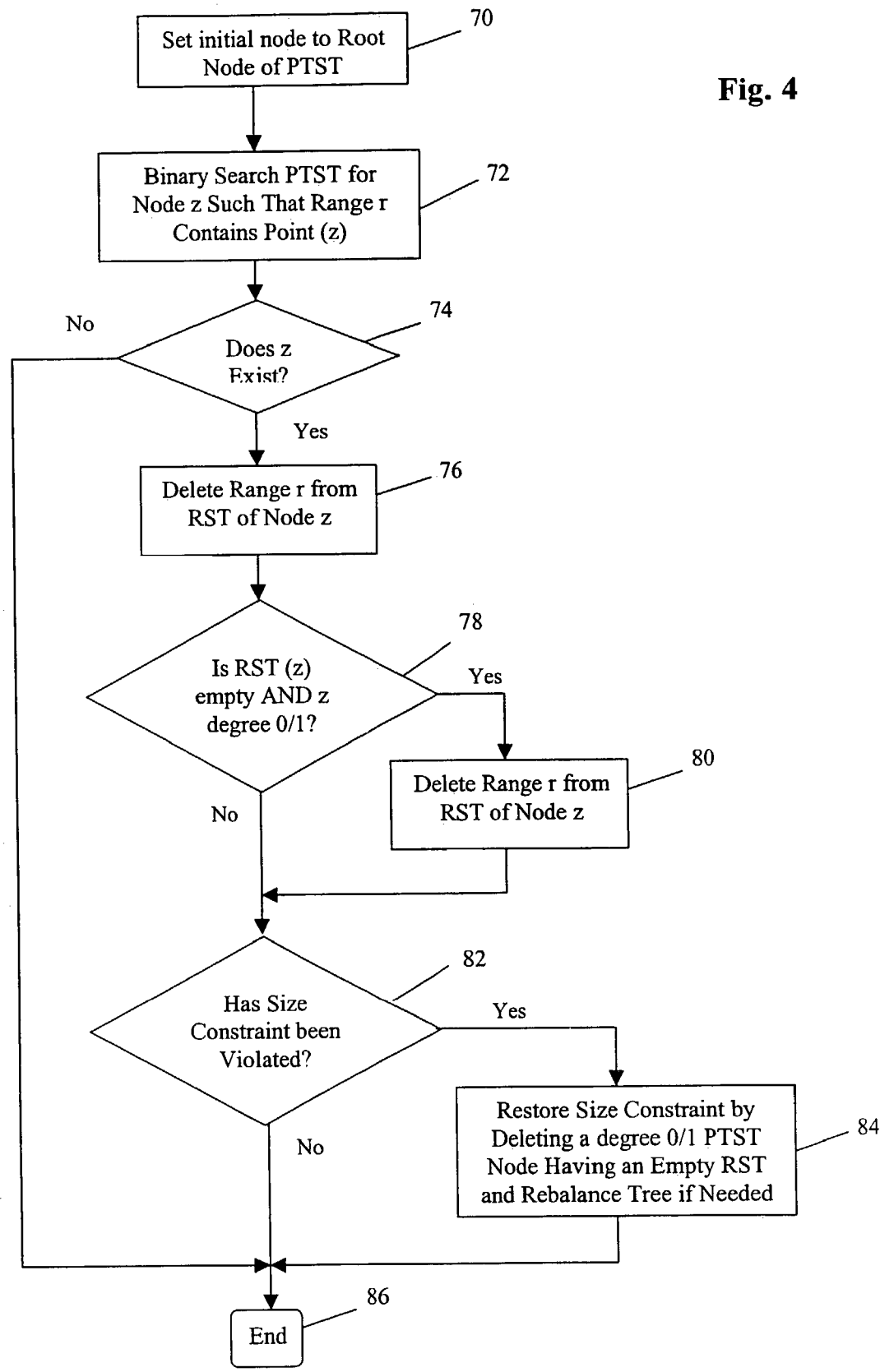
FIG. 4 is a flow chart illustrating the steps for deleting a range from a BOB tree for an NHRT.

Thus, ranges can also be efficiently deleted from router tables, as shown in the flow chart of FIG. 4. To delete range r, the deletion process begins by setting the initial node to the root node of the PTST 70. The PTST is then binary searched to find a PTST node z such that r contains point (z) 72. If such z does not exist 74, the process ends in step 86. If such z exists 74, the range r is deleted from RST(z) of node z 76. If RST(z) becomes empty as a result of a deletion and node z is a degree 0/1 node 78, node z is deleted from the PTST and the PTST rebalanced if needed 80 and processing continues with size constraint checking. If the deletion requires a rotation, the rotation may be performed as described above. If RST(z) is not empty as a result of a deletion, or node z is not a degree 0/1 node in step 78, processing continues with size constraint checking 82.

In step 82, the size constraint of the PTST needs to be checked to ensure that the constraint has not been violated. If the size constraint of the PTST has been violated as determined in step 82, the size of the PTST is restored by deleting a degree 0/1 PTST node with an empty RST and rebalancing the PTST as required 84. The restoring process is invoked, at most, twice and ends 86 after two iterations or until the size constraint has been restored. If the size constraint has not been violated in step 82, then the process ends in step 86.

An exemplary algorithm of the deletion of a range r according to the present invention might be:

```
Algorithm delete(r) {
    // delete the range r
    z = root; // root of PTST
    while (z != null) {
        if (finish(r) < point(z))
            z = leftChild(z);
        else if (start(r) > point(z))
            z = rightChild(z);
        else { // r matches point(z)
            RST(z)->delete(r);
            Cleanup(z);
            return
        }
    }
}
```

An exemplary algorithm to maintain size constraint following a deletion of a range r according to the present invention might be:

```
Algorithm cleanup(z) {
    // maintain size constraint
    if(RST(z) is empty and the degree of z is 0 or 1)
        delete node z from the PTST and rebalance;
    while (|PTST| > 2|R|)
        delete a degree 0 or degree 1 node z with empty
        RST(z) from the PTST and rebalance;
}
```

As a result of using BOB trees for NHRT-type dynamic routers, lookup, insert, and delete times are advantageously reduced. Specifically, the complexity of the BOB operations are O(lognlogmaxR) for lookup, O(logn) for insert, and O(logn) for delete.

II. Prefix Binary on Binary (PBOB) tree for a Highest Priority Prefix Table (HPPT)

An embodiment of the current invention using a PBOB tree for an HPPT will now be discussed. When all rule filters are prefixes in a router tables, better performance can be achieved using a simpler structure than the previously described BOB. By replacing the RST in each node of a BOB with an array linear list, a PBOB structure having reduced overhead requirements can be implemented. In one embodiment, a BOB PTST, having an array linear list at each node, is created to provide efficient lookup.

In a preferred embodiment, the RST in each node z of a BOB PTST is replaced with an array linear list (see Sahni, S., *Data structures, algorithms, and applications in Java*, McGraw Hill, NY, 833 pages (2000)) of pairs of the form (pLength,priority), where pLength is a prefix length (i.e., number of bits) and priority is the prefix priority. ALL(z) has one pair for each range r∈ ranges(x). The pLength value of this pair is the length of the prefix that corresponds to the range r and the priority value is the priority of the range r. The pairs in ALL(z) are in ascending order of pLength. Because the ranges in ranges(z) are nested and match point(z), the corresponding prefixes have different lengths.

Figure 5:
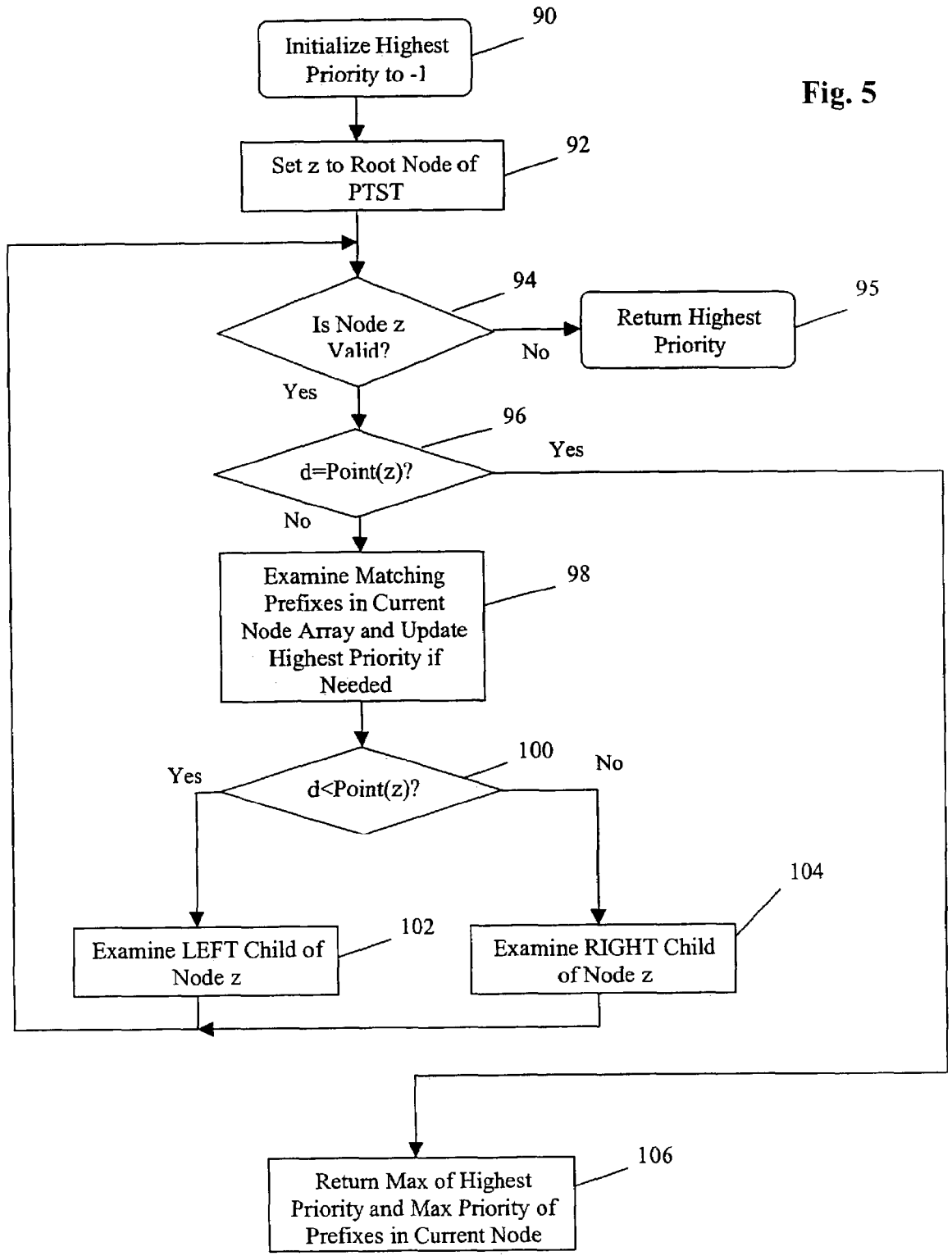
FIG. 5 is a flow chart illustrating the steps for finding the highest priority prefix for a given destination address in a Highest Priority Prefix Table (HPPT).

Referring now to FIG. 5, a flow chart is provided for finding the highest priority of the prefix in a PBOB that matches a destination address d. The process begins by initializing the priority to a value of −1 90 and setting the initial node to the root node of a PTST 92.

Next, if node z is not a valid node 94, the process returns the highest priority 95. If node z is a valid node in step 94, and d is not equal to point (z) 96, then the PTST is searched to find matching ranges. The array in the current node is then examined for a matching prefix and the highest priority value updated if needed 98, taking into account the priorities of those prefixes in the current node array that match d.

Examination of the array in the current node for a matching prefix (also referred to herein as the "searchALL (d,hp) method") utilizes the following lemmas: if a prefix in ALL(z) does not match a destination address d, then no longer-length prefix in ALL(z) matches d. The proof for this lemma assumes $p_1$ and $p_2$ are prefixes in ALL(z); that $l_i$ is the length of $p_i$; that $l_1<l_2$; and that $p_1$ does not match d. Because both $p_1$ and $p_2$ match point(z), $p_2$ is nested within $p_1$. Therefore, all destination d addresses that are matched by $p_2$ are also matched by $p_1$. Accordingly, $p_2$ does not match d.

Determination of whether a length l prefix of ALL(z) matches d uses the following lemma: a length l prefix p of ALL(z) matches d if the most-significant l bits of point(z) and (d) are the same.

If d is less than the point value of node z of the PTST 100, then the left child of node z is examined 102 as the process continues at step 94. Alternatively, if d is not less than the point value of node z of the PTST in step 100, then the right child of node z is examined 104 as the process continues at step 94.

If d is equal to the point value of the current node in step 96, the highest priority value is computed as the maximum of the current highest priority value and the maximum priority of the prefixes of the current PTST node, and the highest priority value is returned 106.

In accordance with the present invention, the following is an exemplary lookup algorithm of the highest-priority prefix that matches the destination d:

```
Algorithm hp(d) {
    // return the priority of hpp(d)
    // easily extended to return hpp(d)
    hp = -1; // assuming 0 is the smallest priority value
    z = root; // root of PTST
    while (z != null) {
        if (d == point(z))
            return max {hp, ALL(z)->maxp( )};
        ALL(z)->searchALL(d,hp);
        if(d < point(z))
            z = leftChild(z);
        else
            z = rightChild(z);
    }
    return hp;
}
```

The entire tree is searched in the above described manner to find the priority of the highest prefix. After searching the tree, the routine returns the highest priority value.

With the assumption that masking operations can be performed in O(1) time for each operation, the number of PTST nodes reached in the "while (z!=null)" loop described in the algorithm above is O(logn) and the time spent at each node z that is reached is linear in the number of prefixes in ALL(z) that match d. Because the PTST has at most maxR prefixes that match d, the complexity of the previously described lookup method is O(logn+maxR)=O(W) time, where W is the length of the longest prefix, each.

Insertion and deletion of prefixes in the disclosed PBOB are performed in a manner similar to that used for a BOB structure as described above. In one embodiment, the prefixes in the array at a given node are stored in order of increasing length. In a preferred embodiment, rMax is determined by examining the prefixes in ALL(x) in increasing order of length; where ALL'(y) is determined by prepending the prefixes in ALL(x) whose length is ≦ the length of rMax. The time required to find rMax is O(maxRI). This period of time is also required to compute ALL'(y) and ALL'(x). Accordingly, the overall complexity of an insert/delete operation is O(logn+maxR)=O(W).

As a result of using PBOB trees for HPPT-type dynamic routers, lookup, insert, and delete times are advantageously reduced. Specifically, although the complexity of the disclosed PBOB operations are O(W) for lookup, O(W) for insert, and O(W) for delete, the cache misses of each operation are greatly reduced in comparison to trie.

III. Longest Matching Prefix Binary on Binary tree (LMP-BOB) for a Longest Matching Prefix Table (LMPT).

An embodiment of the current invention using a LMPBOB tree for an LMPT will now be discussed. A PBOB as described above is used to represent an LMPT to obtain the same performance as for an HPPT. However, an advantageous reduction in the memory required for the data structure is expected to be realized by replacing the array linear list stored at each node of the PTST (of PBOB described above) by a W-bit vector, bit. bit(z)[i] denotes the ith bit of the bit vector stored in node z of the PTST, bit(z)[i]=1 if ALL(z) has a prefix whose length is i. W-bit vectors have been discussed by Suri et al. in their data structures ("Scalable IP lookup with fast updates," *GLOBECOM* (2001)).

Figure 6:
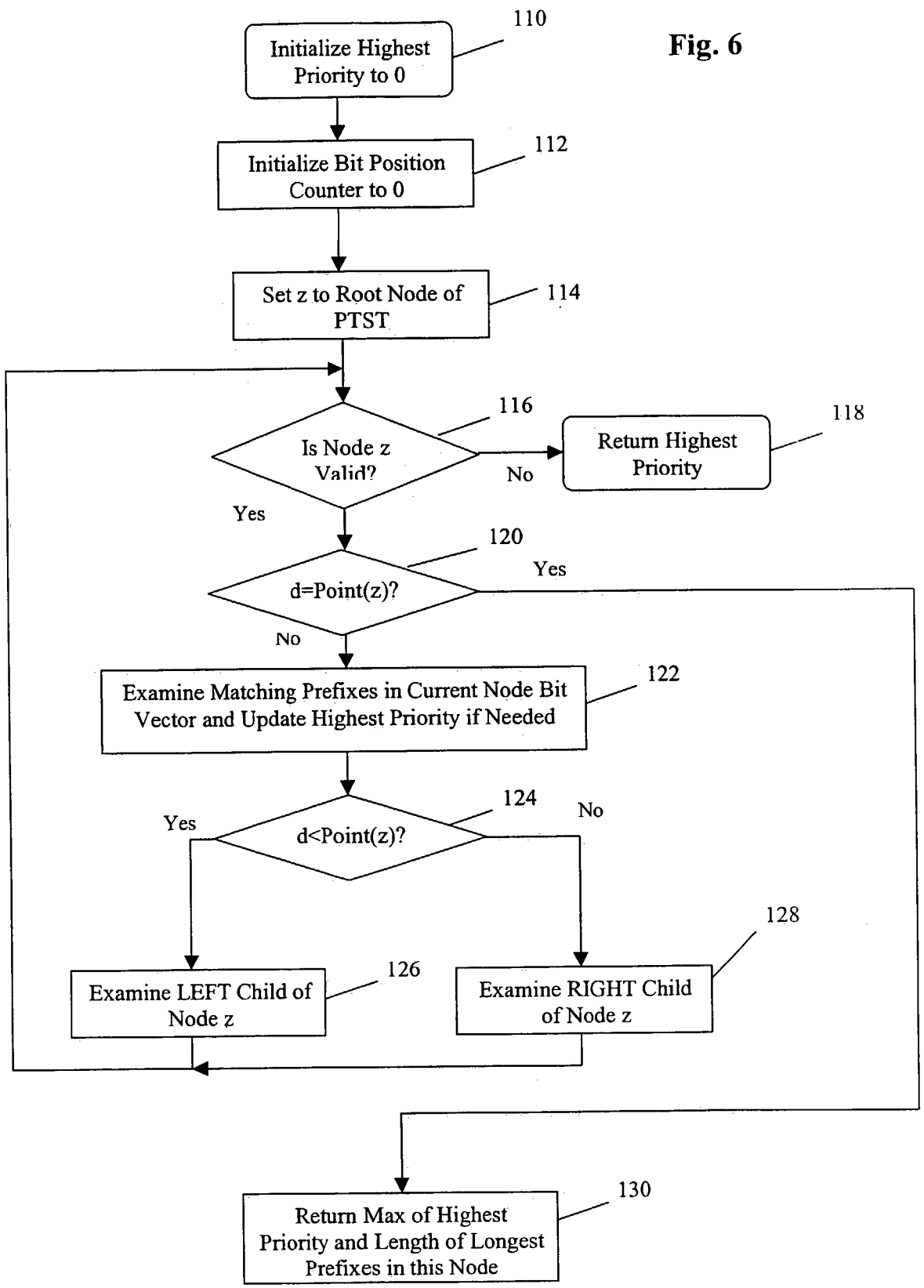
FIG. 6 is a flow chart illustrating the steps for finding the longest matching prefix for a given destination address in a Longest Matching Prefix Table (LMPT).

Referring now to FIG. 6, a flow chart is provided for finding the priority of the longest matching prefix in a LMPBOB that matches a destination address d. The process begins by initializing the highest priority to a value, such as zero (0) 110, initializing a bit position counter to a value, such as zero (0) 112, and setting the initial node to the root node of a PTST 114.

Next, if node z is not a valid node 116, the process returns the highest priority 118. If node z is a valid node in step 116, and d is not equal to point(z) 120, then the PTST is searched to find matching ranges. The current node bit vector is examined for a matching prefix and the highest priority value updated if needed 122, taking into account the priorities of those prefixes in the current node bit vector that match d.

The examination of the current node bit vector for a prefix that matches d and the highest priority value (also referred to herein as the "search method") utilizes the following lemmas: (1) if bit(z)[i] corresponds to a prefix that does not match the destination address d, then bit(z)[j],j>i corresponds to a prefix that does not match d, and (2) let w and z be two nodes in a PTST such that w is a descendent of z and suppose that z->bit(q) corresponds to a prefix $p_q$ that matches d; w->bit(j), j≦q cannot correspond to a prefix that matches d.

The proof for lemma (1) is' that bit(z)[q] corresponds to the prefix $p_q$ whose length is q and which equals the q most significant bits of point(z). So, $p_i$ matches all points that are matched by $p_j$. Therefore, if $p_i$ does not match d, $p_j$ does not match d either. The proof for lemma (2) begins with the supposition that w->bit(j) corresponds to the prefix $p_j$, $p_j$ matches d, and j≦q. So, $p_j$ equals the j most significant bits of d. Since $p_q$ matches d and also point(z), d and point(z) have the same q most significant bits. Therefore, $p_j$ matches point (z). So, by the range allocation rule, $p_j$ should be stored in node z and not in node w, a contradiction.

The evaluation of whether a prefix matches d can be implemented using masks and Boolean operations so as to have complexity O(1). Since a bit vector has the same number of bits as does a destination address, this assumption is consistent with the implicit assumption that arithmetic on destination addresses takes $O(1)$ time. The total time spent in all invocations of the search method is $O(W+\log n)$. The time spent in the remaining steps of lmp(d) is $O(\log n)$. Therefore, the overall complexity of lmp(d) is $O(W+\log n)=O(W)$. Although the time complexity is $O(W)$, the number of cache misses is $O(\log n)$ where each bit vector takes the same amount of space as needed to store a destination address.

Returning to the method illustrated in FIGS. 6A and 6B, if d is less than the point value of node z of the PTST 124, then the left child of node z is examined 126 as the process continues at step 116. Alternatively, if d is not less than the point value of node z of the PTST 124, then the right child of node z is examined 128 as the process continues at step 116.

If destination d is equal to the point value of the current node in step 120, the highest priority value is computed as the maximum of the current highest priority value and the length of the longest prefixes in the current PTST node, and the highest priority value is returned 130.

An exemplary lookup algorithm of the longest matching prefix for destination d according to the present invention might be:

```
Algorithm lmp(d) {
    // return the length of lmp(d)
    // easily extended to return lmp
    hp = 0; // length of lmp
    k = 0; // next bit position to examine is k+1
    z = root; // root of PTST
    while (z != null) {
        if(d == point(z))
            return max {k, z->longest( )};
        bit(z)->searchBitVector(d,hp,k);
        if (d < point(z))
            z = leftChild(z);
        else
            z = rightChild(z);
    }
    return hp;
}
```

The entire tree is searched in the above described manner to find the priority of the highest prefix. After searching the tree, the routine returns the highest priority value.

Insertions and deletions are accomplished in a manner similar to that disclosed for the PBOB tree for an HPPT. However, rather than inserting or deleting a prefix from a node array, the bit in the bit vector of the selected node corresponding to the length of the prefix being added or deleted is set to 1 for insertion or 0 for deletion. Essentially, rather than inserting or deleting a prefix from an ALL(z), bit(z)[l] is set wherein l is the length of the prefix being inserted or deleted, to 1 or 0, respectively. Further, for the rotation, the largest integer iMax is found such that the prefix that corresponds to bit(x)[iMax] matches point(y). The first (bit 0 comes before bit 1) iMax bits of bit'(y) are the first iMax bits of bit(x) and the remaining bits of bit'(y) are the same as the corresponding bits of bit(y). bit'(x) is obtained from bit(x) by setting its first iMax bits to 0.

As a result of using LMPBOB trees for LMPT-type dynamic routers, lookup, insert, and delete times are advantageously reduced. Specifically, the complexity of the disclosed PBOB operations are $O(W)$ for lookup, with the number of cache misses $O(\log n)$, $O(\log(Wn))$ for insert, and delete, with the number of cache misses $O(\log n)$.

IV. Implementation

In an embodiment, the current tree structures and methods are implemented in C++. Because the C++ built-in functions of new and delete are prohibitively time consuming, memory management methods were designed to maintain a list of free memory and the new routine used only to retrieve a block of memory as needed.

In the BOB embodiment, each node z of the PTST has the following fields: color, point(z), RST, leftChild and rightChild. In addition, the following fields are included: maxPriority (maximum priority of the ranges in ranges(z), minSt (smallest starting point of the ranges in ranges(z)), and maxFn (largest finish point of the ranges in ranges(z)). By way of example, assuming the PTST has 7 fields and color and maxPriority fields are allocated 1 byte each and the remaining fields allocated 4 bytes each, a node size is 26 bytes. For improved cache performance, it is desirable to align node to 4-byte memory boundaries and simplify the node size into an integral multiple of 4 bytes. Thus, using these fields, the node size for the BOB PTST is 28 bytes.

Further, the RST nodes embedded in the PTST are assigned the following fields: color, mp, st, fn, p, leftChild and rightChild. By way of example, where 1 byte is allocated for color, p, and mp fields each, and 4 bytes allocated for each of the remaining fields, the size of an RST node becomes 19 bytes. As described above, for ease of alignment to 4-byte boundaries, the RST-node is simplified into an integral multiple of 4-bytes resulting in a RST node size of 20 bytes.

For doubly-linked lists of PTST nodes with an empty RST, the minSt and maxFn fields were used to, respectively, represent left and right pointers. Therefore, there is no space overhead (other than the space needed to keep track of the first node) associated with maintaining the two doubly-linked lists of PTST nodes that have an empty RST. Because a BOB may have 2n PTST nodes, n nonempty RST's, and n RST nodes, the memory requirements for a BOB are 84n bytes.

In the PBOB embodiment, each node of the PTST has the following fields: color, point(z), ALL (including subfields plength and priority), size, length, leftChild and rightChild, where ALL is a one-dimensional array, each entry of which has the subfields pLength and priority, size is the dimension of the array, and length is the number of pairs currently in the array linear list. The array ALL initially had enough space to accommodate 4 pairs (pLength,priority). When the capacity of an ALL is exceeded, the size of the ALL is increased by 4 pairs.

In addition, to improve the lookup performance, the field maxPriority (maximum priority of the prefixes in ALL(z)) maybe added. The field minSt (smallest starting point of the prefixes in ALL(z)) and maxFn (largest finish point of the prefixes in ALL(z)) are easily computed from point(z) and the pLength of the shortest (i.e., first) prefix in ALL(z). By way of example, where 1 byte is allocated for each of the fields: color, size, length, maxPriority, pLength, and priority; and 4 bytes for the remaining fields, the initial size of a PTST node of PBOB is 24 bytes.

For the doubly-linked lists of PTST nodes with an empty ALL, 8 bytes of memory were used to allocate the empty array ALL to, respectively, represent left and right pointers. Because an instance of PBOB may have up to 2n PTST nodes, the minimum space/memory required by these 2n PTST nodes is $24*2n=48n$ bytes. However, some PTST nodes may have more than 4 pairs in their ALL. In one embodiment, there can be at most n/5 such nodes. Thus, according to this embodiment, the maximum memory requirements for a PBOB are $48n+8n/5=49.6n$ bytes.

In the LMPBOB embodiment, each node of the PTST has the following fields: color, point(z), bit, leftChild and right-Child. In addition, to improve the lookup performance of PBOB, the fields minLength (minimum of lengths of prefixes in bit(z)) and maxLength (largest finish point of the prefixes in bit(z)) may be added. These fields, minSt and maxLength can be computed from point(z) and minLength. By way of example for Ipv4, 1 byte is allocated for each of the fields: color, minLength, and maxLength; 8 bytes allocated for bit; and 4 bytes for each of the remaining fields, the size of a PTST node of LMPBOB is 23 bytes. As described above, to easily align PTST nodes along 4-byte boundaries, an LMP PTST node is padded so that its size is 24 bytes.

For the doubly-linked lists of PTST nodes with an empty bit vector, 8 bytes of memory were used to allocate the empty bit vector bit to represent left and right pointers. Thus, no space overhead was associated with maintaining the two doubly-linked lists of PTST nodes that have an empty bit. Further, because an instance of LMPBOB may have up to 2n PTST nodes, the space/memory required by these 2n PTST nodes is 24*2=48n bytes.

V. EXAMPLES

Figures 7, 8:
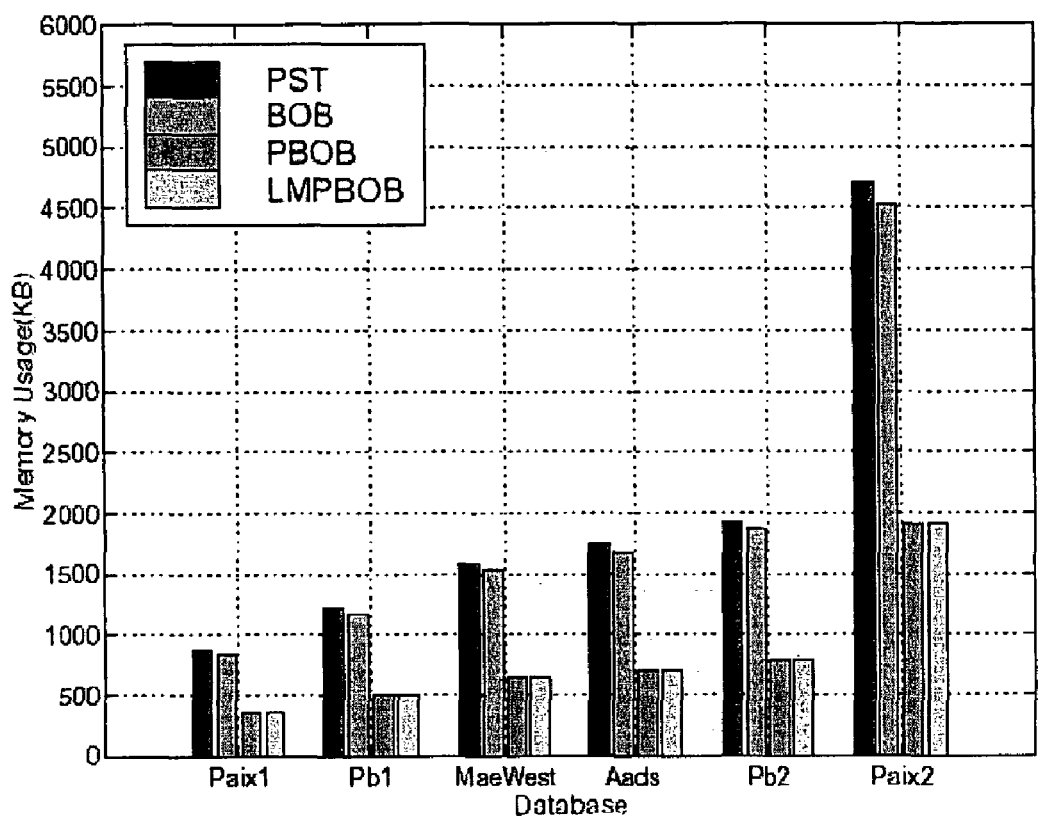
FIG. 7 is a table tabulating the memory usage of a BOB, a PBOB, and a LMPBOB of the current invention compared to a PST data structure.
FIG. 8 is a graph illustrating the memory usage of BOB, PBOB, and LMPBOB data structures after inserting all prefixes compared to a PST data structure.
Figure 9:
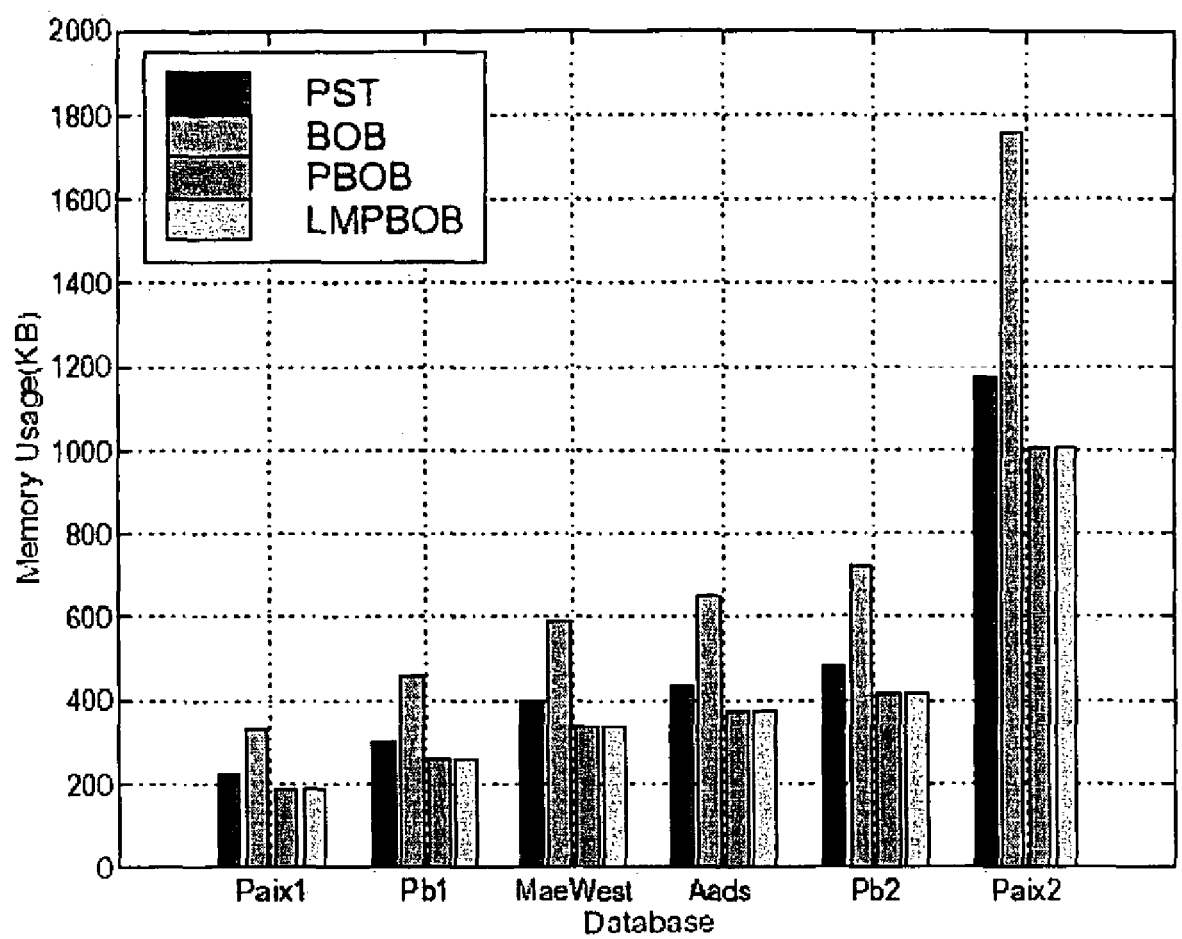
FIG. 9 is a graph illustrating the memory usage of BOB, PBOB, and LMPBOB data structures after inserting all prefixes then removing 75% compared to a PST data structure.

An implementation of the current invention using an 1.4 GHz Pentium 4 Personal Computer having 256 KB L2 cache will now be presented. The preceding method for prefix matching using PSTs was incorporated into a C++ program running on a 1.4 GHz Pentium 4 PC and the resulting performance compared to a method using PST's. For the test, databases of Internet Protocol, Version 4 (IPv4) packets, including Paix1, Pb1, MaeWest, Aads, Pb2, and Paix2, were used. Two memory measurements were performed: Measure1 and Measure2. Measure1 measured the memory used by a data structure that is the result of a series of insertions made into an initially empty instance of the data structure. By way of example, with Measure1 less than 1% of the PTST-nodes in the constructed data structures (i.e., BOB, PBOB, and LMPBOB). Measure 2 measured the memory used after 75% of the prefixes in the data structure constructed for Measure1 were deleted. The results of the test are shown in FIG. 7 and also plotted as graphs in FIGS. 8 and 9.

With regard to the performance speed, timing measurements were performed for lookup times in BOB, PBOB, and LMPBOB data structures. The mean time to find the longest matching prefix was analyzed. A BOB, PBOB, and LMPBOB containing all the prefixes of a prefix database were created. Next, a random permutation of the set of start points of the ranges corresponding to the prefixes was obtained. The resulting permutation determined the order in which to search for the longest matching prefix for each of the start points. The time required to determine all of the longest matching prefixes was measured and averaged over the number of start points.

Figure 11:
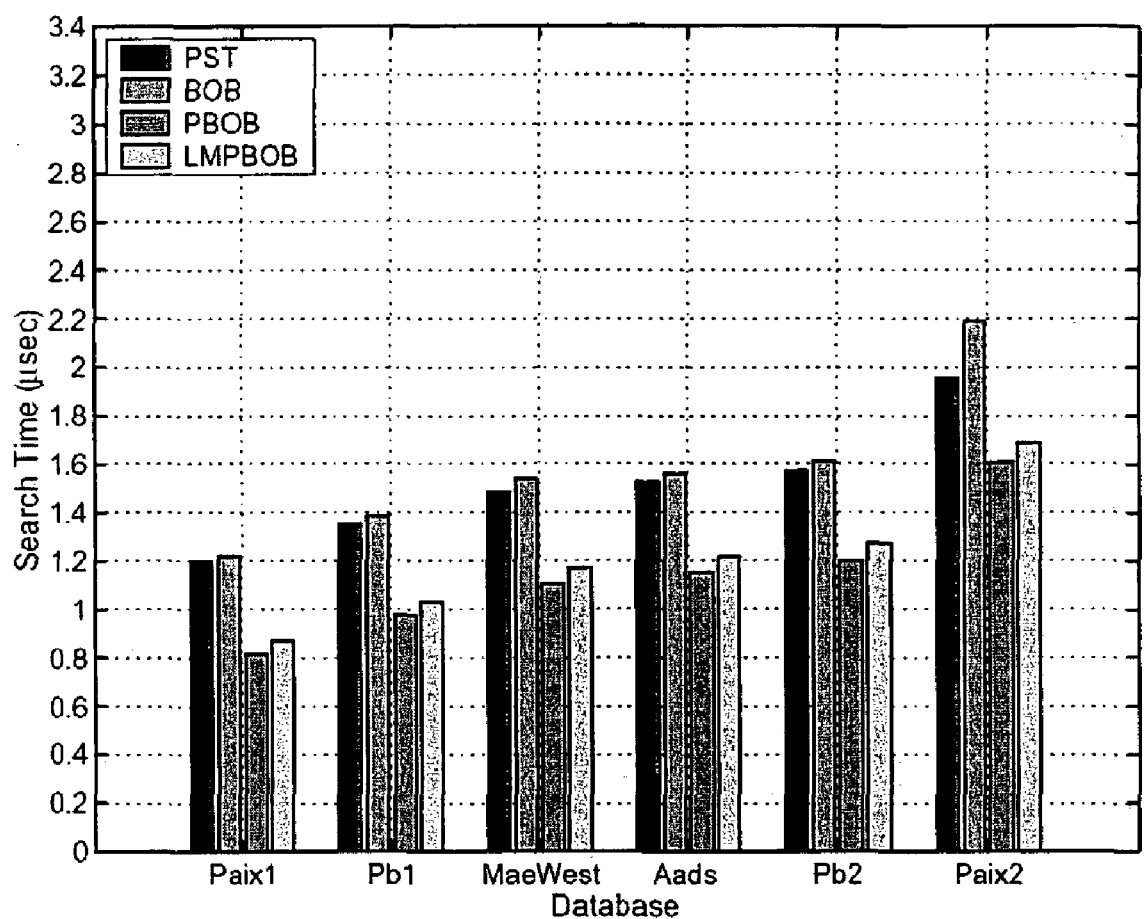
FIG. 11 is a graph illustrating the search times for BOB, PBOB, and LMPBOB data structures compared to a PST data structure.

The results of the comparison between the prefix matching times for the BOB, PBOB, and LMPBOB structures and a PST structure are shown in FIGS. 10 and 11. Notably, the PBOB and LMPBOB structure lookup times are 20%-30% faster than the PST lookup times, while the BOB, was slightly slower than the PST.

Figure 12:
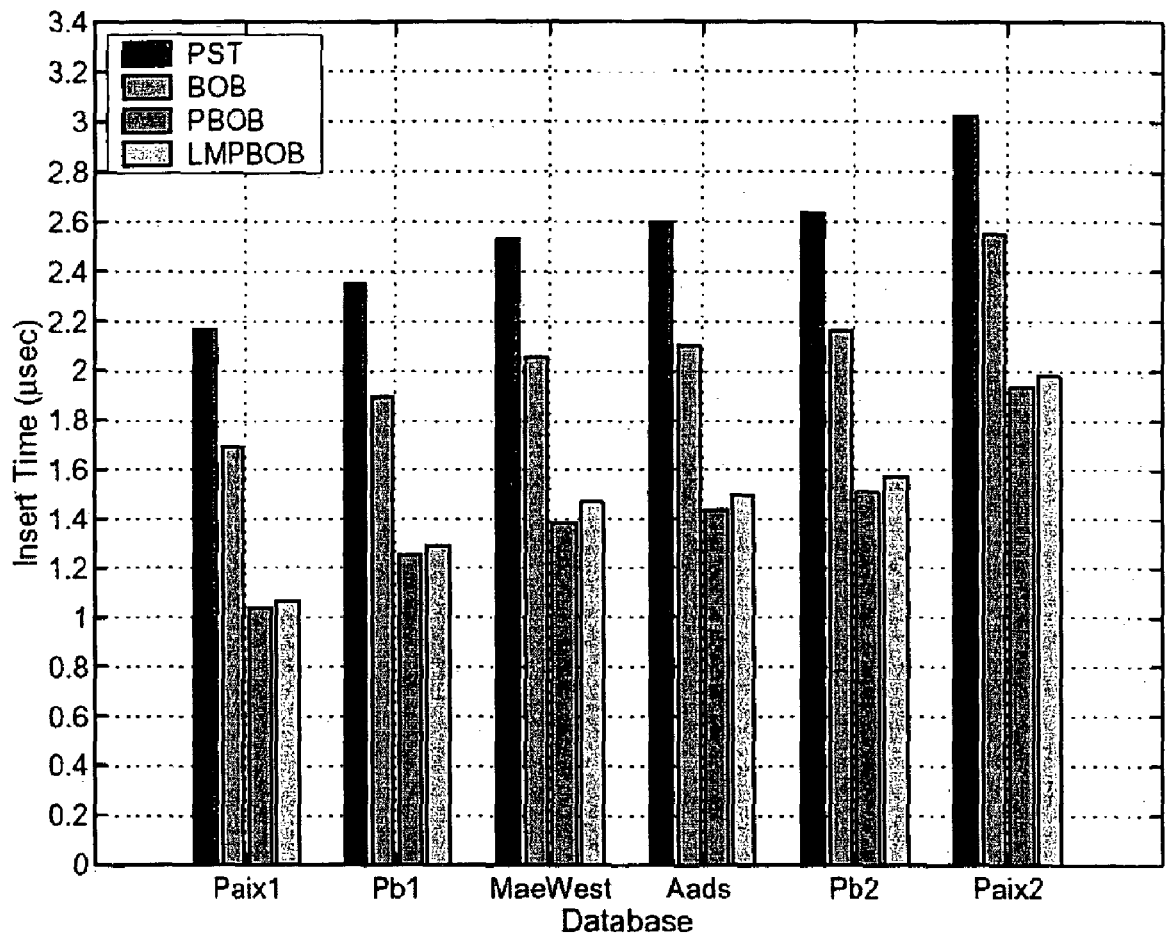
FIG. 12 is a graph illustrating the insert times for BOB, PBOB, and LMPBOB data structures compared to a PST data structure.

Insertion and deletion times were also characterized and compared. To obtain the mean time to insert a prefix, a group of prefixes were randomly permuted and the first 67% of the prefixes were inserted into an initially empty data structure. Then, the time to insert the remaining 33% of the prefixes into the data structure was measured and the mean insertion time computed. The results in FIG. 12 show that insertion times for the PBOB and LMPBOB structures were 40% to 60% of the insertion time required using a PST structure, while insertions into the PST took 20% to 25% longer than insertions into the BOB.

Figure 13:
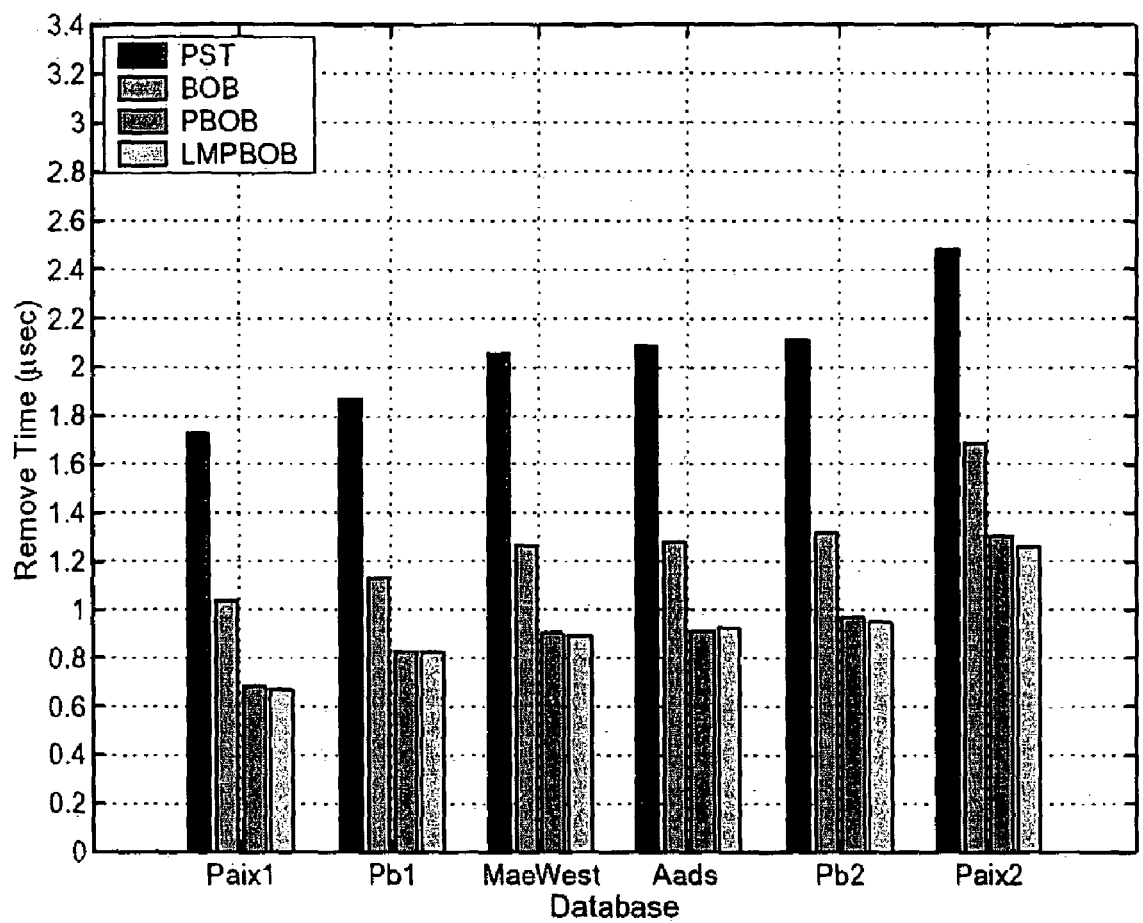
FIG. 13 is a graph illustrating the delete times for BOB, PBOB, and LMPBOB data structures compared to a PST data structure.

Finally, the deletion times were compared by measuring the time required to delete 33% of the prefixes from a data structure. The results, as shown in FIG. 13, show that deletion times for the BOB and PBOB structures were 50% less than the deletion times required using an PST structure, while deletions from the BOB took 40% less time than deletions from the PST.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, programmable logic device, or semiconductor memory such as read-only memory (ROM). etc. The article of manufacture containing the computer code may be made and/or used by executing the code directly from one medium or by copying the code from one medium to another medium.

One skilled in the art of computer science will easily be able to combine the software created as described with appropriate general purpose or special purpose computer hardware, including programmable logic devices, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention. User input may be received from the keyboard, mouse, pen, voice, touch screen, or any other means by which a human can input data into a computer, including through other programs such as application programs.

It should be understood that the examples and embodiments described herein are for illustrative purposes only and that various modifications or changes in light thereof will be suggested to persons skilled in the art and are to be included within the spirit and purview of this application.

We claim:

1. A computer-implemented method for improving, in dynamic routing tables of a dynamic router, processes for matching a highest-priority range with a destination address in $O(\log^2 n)$ time and inserting or deleting rules in $O(\log n)$ time, the method comprising:

applying a top level balanced binary search tree (PTST) with at least one node comprising a lower level range search tree (RST) to a nonintersecting highest priority rule table comprising at least one nonintersecting range and corresponding priority, wherein the PTST comprises at most 2n nodes, with each of the PTST nodes associated with a point value, wherein the PTST and the RST are stored in a memory of the dynamic router;

applying a range allocation rule to allocate to each PTST node a subset of the nonintersecting ranges and corresponding priorities;

applying an RST to organize the subset of nonintersecting ranges and corresponding priorities allocated to each PTST node; and maintaining balanced PTST, the PTST having up to n empty nodes, wherein matching a highest-priority range with a destination address is performed in O($\log^2 n$) time and inserting or deleting rules is performed in O($\log n$) time, wherein using the balanced PTST speeds up matching a highest-priority range with a destination address and inserting and deleting rules, where O( ) denotes Order notation of performance time and n is a total number of prefixes in the nonintersecting highest priority rule table.

2. The method according to claim 1, wherein the PTST and RST are red-black trees.

3. The method according to claim 1, for matching a highest-priority range with a destination address, further comprising the steps of:
conducting a search of the PTST based on the destination address, wherein the search is conducted along a search path from a root of the PTST to a leaf of the PTST; and
examining the RST(s) of a PTST node along the search path for a best matching range and corresponding priority.

4. The method according to claim 1, for inserting a new rule, further comprising the steps of:
setting an initial node to a root node of the PTST in preparation of inserting a new range r;
conducting a search on the PTST for a node z such that the range r contains the point value of z;
if said node z exists, inserting range r into the RST(z); and
if said node z does not exist, creating a new PTST node, inserting the new PTST node into the PTST, and inserting range r into the RST of the new PTST node.

5. The method according to claim 4, wherein when the new PTST node is inserted into the PTST, the PTST is rebalanced.

6. The method according to claim 1, for deleting a rule, further comprising the steps of:
conducting a search of the PTST for a node z such that the range r contains point(z);
if node z exists, deleting range r from the RST of the node z;
if the RST of node z becomes empty as a result of deleting range r and node z is a degree 0/1 node; deleting node z from the PTST and rebalancing the PTST; and
when a size constraint has been violated, deleting a degree 0/1 PTST node having an empty RST and rebalancing the PTST.

7. A computer-implemented method for improving, in dynamic routing tables of a dynamic router, processes of matching a highest-priority prefix with a destination address and inserting or deleting new rules in O(W) time, the method comprising:
applying a top level balanced binary search tree (PTST) with at least one node comprising an array linear list (ALL) to a highest priority prefix table comprising at least one pair, wherein the pair comprises a prefix and corresponding priority, wherein the PTST comprises at most 2n nodes, with each of the PTST nodes associated with a point value, wherein the PTST and the ALL are stored in a memory of the dynamic router;
applying a range allocation rule to each PTST node to allocate to each PTST node a subset of the pairs;
applying an ALL to organize the pairs allocated to each PTST node, wherein the ALL comprises a pair of prefix and corresponding priority; and
maintaining balanced PTST, the balanced PTST having up to n empty nodes, wherein matching a highest-priority prefix with a destination address and inserting or deleting rules are performed in O(W) time, wherein using the balanced PTST speeds up matching a highest-priority prefix with a destination address and inserting and deleting rules, where O( ) denotes Order notation of performance time, W denotes a maximum possible length of a prefix in the highest priority prefix table, and n is a total number of prefixes in the highest priority prefix table.

8. The method according to claim 7, wherein the PTST is a red-black tree.

9. The method according to claim 7, for matching a highest-priority prefix with a given destination address, further comprising the steps of:
conducting a search of the PTST based on the destination address, wherein the search is conducted along a search path from a root of the PTST to a leaf of the PTST; and
examining the ALL(s) of the PTST nodes along the search path for a best matching prefix and corresponding priority.

10. The method according to claim 7, for inserting a new rule, further comprising the steps of:
setting an initial node to a root node of the PTST in preparation of inserting a new prefix p;
conducting a search on the PTST for a node z such that the prefix p contains the point value of z;
if said node z exists; inserting prefix p into ALL(z); and
if said node z does not exist, creating a new PTST node, inserting the new PTST node into the PTST, and inserting prefix p into an ALL of the new PTST node.

11. The method according to claim 10, wherein when the new PTST node is inserted into the PTST, the PTST is rebalanced.

12. The method according to claim 7, for deleting a rule, further comprising the steps of:
conducting a search of the PTST for a node z such that the prefix p contains point(z);
if such node z exists, deleting prefix p from the ALL of the node z;
if the ALL becomes empty as a result of deleting prefix p and node z is a degree 0/1 node, deleting node z from the PTST and rebalancing the PTST, and
when a size constraint has been violated, deleting a degree 0/1 PTST node with an empty ALL and rebalancing the PTST.

13. A computer-implemented method for improving, in dynamic routing tables of a dynamic router, processes for longest-prefix matching in O(W) time and rule insertion and deletion in O(log n) time, comprising:
applying a top level balanced binary search tree (PTST) with at least one node comprising a W-bit vector (bit(z)) to a longest-matching prefix-table comprising at least one prefix, wherein the PTST comprises at most 2n nodes, with each of the PTST nodes associated with a point value, wherein the PTST and the bit(z) are stored in a memory of the dynamic router;
applying a range allocation rule to allocate to each PTST node a subset of prefixes;
applying the bit(z) to organize the prefixes allocated to each PTST node, wherein an ith position of bit(z) is set to 1 if the prefix with length i is allocated to a PTST node; and
maintaining balance in the PTST, wherein longest prefix matching is performed in O(W) time and rule insertion or deletion is performed in O(log n) time, wherein using the PTST speeds up longest prefix matching and rule insertion and deletion, where O( ) denotes Order notation of performance time, W denotes a maximum possible length of the at least one prefix, and n is a total number of prefixes in the longest-matching prefix-table.

14. The method according to claim 13, wherein the PTST is a red-black tree.

15. The method according to claim 13, for longest-prefix matching, further comprising the steps of:
conducting a search of the PTST based on a given destination address, wherein the search is conducted along a search path from a root of the PTST to a leaf of the PTST; and
examining the bit(z) vectors of PTST nodes along the search path to find a prefix with the longest matching length.

16. The method according to claim 13, for inserting a new rule, further comprising the steps of:
setting an initial node to a root node of the PTST in preparation of inserting a new prefix p;
conducting a search on the PTST nodes for the bit(z) such that the prefix p contains the point value of z;
if there exists a PTST node having the bit(z) such that the prefix p contains the point value of z, inserting prefix p into the bit(z); and
if there does not exist a PTST node having the bit(z) such that the prefix p contains the point value of z, creating a new PTST node, inserting the new PTST node into the PTST, and inserting prefix p into the bit(z) of the newly created PTST node.

17. The method according to claim 16, wherein when the new PTST node is inserted into the PTST, the PTST is rebalanced.

18. The method according to claim 13, for deleting a rule, further comprising the steps of:
conducting a search of the PTST for a node z such that the prefix p contains point(z);
if node z is present, deleting prefix p from the bit(z);
if the bit(z) vector becomes empty as a result of deleting prefix p and node z is a degree 0/1 node, deleting node z from the PTST and rebalancing the PTST; and
when a size constraint has been violated, deleting a degree 0/1 PTST node having an empty bit(z) and rebalancing the PTST.

19. A computer program product for improving, in dynamic routing tables of a dynamic router, processes for matching a highest-priority range with a destination address and inserting or deleting rules, the computer program product recorded on computer readable medium for routing packets comprising: a computer readable medium for receiving packets, a computer readable medium for identifying each rule matching the value of the packet; a computer readable medium for matching, inserting, or deleting rules in a dynamic, nonintersecting highest priority rule table (NHRT), and a computer readable medium for performing steps of manipulating the dynamic table, said steps comprising:
applying a top level balanced binary search tree (PTST) with at least one node comprising a lower level range search tree (RST) to a nonintersecting highest priority rule table comprising at least one nonintersecting range and corresponding priority, wherein the PTST comprises at most 2n nodes, with each of the PTST nodes associated with a point value, where n is a total number of prefixes in the nonintersecting highest priority rule table;
applying a range allocation rule to allocate to each PTST node a subset of the nonintersecting ranges and corresponding priorities;
applying an RST to organize the subset of nonintersecting ranges and corresponding priorities allocated to each PTST node; and
maintaining balance in the PTST, wherein using the PTST speeds up marching a highest-priority range with a destination address and inserting and deleting rules.

20. The computer program product according to claim 19, wherein the PTST and RST are red-black trees.

21. A computer program product for improving, in dynamic routing tables of a dynamic router, processes of matching a highest-priority prefix with a destination address and inserting or deleting new rules, the computer program product recorded on computer readable medium for routing packets comprising: a computer readable medium for receiving packets, a computer readable medium for identifying each rule matching the value of the packet; a computer readable medium for matching, inserting, or deleting prefixes in a dynamic, highest priority prefix table (HPPT), and a computer readable medium for performing steps of manipulating the dynamic table, said steps comprising:
applying a top level balanced binary search tree (PTST) with at least one node comprising an array linear list (ALL) to a highest priority prefix table comprising at least one pair, wherein the pair comprises a prefix and corresponding priority, wherein the PTST comprises at most 2n nodes, with each of the PTST nodes associated with a point value, where n is a total number of prefixes in the highest priority prefix table;
applying a range allocation rule to each PTST node to allocate to each PTST node a subset of the pair of prefix and corresponding priority;
applying an ALL to organize the prefixes and corresponding priorities allocated to each PTST node, wherein the ALL comprises the pair of prefix length and corresponding prefix priority; and
maintaining balance in the PTST, wherein using the PTST speeds up matching a highest-priority prefix with a destination address and inserting and deleting rules.

22. The computer program product according to claim 21, wherein the PTST is a red-black tree.

23. A computer program product for improving, in dynamic routing tables of a dynamic router, processes for longest-prefix matching and rule insertion and deletion, the computer program product recorded on computer readable medium for routing packets comprising: a computer readable medium for receiving packets, a computer readable medium for identifying each rule matching the value of the packet; a computer readable medium for matching, inserting, or deleting prefixes in a dynamic, longest-matching prefix table (LMPT), and a computer readable medium for performing steps of manipulating the dynamic table, said steps comprising:
applying a top level balanced binary search tree (PTST) with at least one node comprising a W-bit vector (bit(z)) to a longest-matching prefix-table comprising at least one prefix, wherein the PTST comprises at most 2n nodes, with each of the PTST nodes associated with a point value, where W denotes a maximum possible length of the at least one prefix and n is a total number of prefixes in the longest-matching prefix table;
applying a range allocation rule to allocate to each PTST node a subset of the prefixes;
applying the bit(z) to organize the prefixes allocated to each PTST node, wherein an ith position of bit(z) is set to 1 if the prefix with length i is allocated to a PTST node; and
maintaining balance in the PTST, wherein using the PTST speeds up longest prefix matching and rule insertion and deletion.

24. The computer program product according to claim 23, wherein the PTST is a red-black tree.

* * * * *

UNITED STATES PATENT AND TRADEMARK OFFICE
CERTIFICATE OF CORRECTION

PATENT NO. : 7,509,300 B2
APPLICATION NO. : 10/613963
DATED : March 24, 2009
INVENTOR(S) : Sartaj Kumar Sahni and Haibin Lu It is certified that error appears in the above-identified patent and that said Letters Patent is hereby corrected as shown below:

<u>Column 6,</u>
Line 22, "point(root)$\leqq$start(r)" should read --point(root) < start(r)--.

<u>Column 8,</u>
Line 14, "than a new node" should read --then a new node--.
Line 64, "rotation ranges(z)" should read --rotation. ranges(z)--.
Line 66, "rotation ranges(subtree(x))" should read --rotation. ranges(subtree(x))--, <u>Column 10,</u>
Line 42, "a router tables" should read --a router table--.

Signed and Sealed this

Twenty-ninth Day of September, 2009

David J. Kappos
*Director of the United States Patent and Trademark Office*